(12) United States Patent
Kanazashi

(10) Patent No.: US 8,208,207 B2
(45) Date of Patent: Jun. 26, 2012

(54) ZOOM LENS SYSTEM

(75) Inventor: Yasuo Kanazashi, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 13/010,207

(22) Filed: Jan. 20, 2011

(65) Prior Publication Data

US 2011/0188128 A1 Aug. 4, 2011

(30) Foreign Application Priority Data

Jan. 29, 2010 (JP) ................... 2010-018039
Oct. 22, 2010 (JP) ................... 2010-237418

(51) Int. Cl.
G02B 15/14 (2006.01)
(52) U.S. Cl. ........................ 359/689; 359/682
(58) Field of Classification Search .................. 359/682, 359/689
See application file for complete search history.

(56) References Cited

U.S. PATENT DOCUMENTS

| 7,023,623 | B2 | 4/2006 | Miyatake et al. | |
| 8,098,442 | B2 * | 1/2012 | Iiyama et al. | 359/689 |
| 2009/0009884 | A1 | 1/2009 | Ohtake et al. | |

FOREIGN PATENT DOCUMENTS

| JP | 2004-239973 | 8/2004 |
| JP | 2008-203449 | 9/2008 |
| JP | 2008-203881 | 9/2008 |
| JP | 2008-241794 | 10/2008 |

* cited by examiner

Primary Examiner — Jack Dinh
(74) Attorney, Agent, or Firm — Greenblum & Bernstein P.L.C.

(57) ABSTRACT

A zoom lens system includes a negative first lens group, a positive second and third lens groups, wherein distances between the lens groups change during zooming from the short to long focal length extremities. The following conditions (1) and (2) are satisfied:

$$0.20 < F2/Ft < 0.45 \quad (1), \text{ and}$$

$$-3.00 < F2/fm < -1.00 \quad (2),$$

wherein F2 designates the combined focal length of the second lens group, Ft designates the focal length of the entire the zoom lens system at the long focal length extremity, fm designates the focal length of the surface on the image side of the lens element closest to the image side within the second lens group, fm=(1−nm)/rm, and nm and rm respectively designate the refractive index at the d-line, and the radius of curvature of the surface on the image side of, the lens element provided closest to the image side within the second lens group.

7 Claims, 21 Drawing Sheets

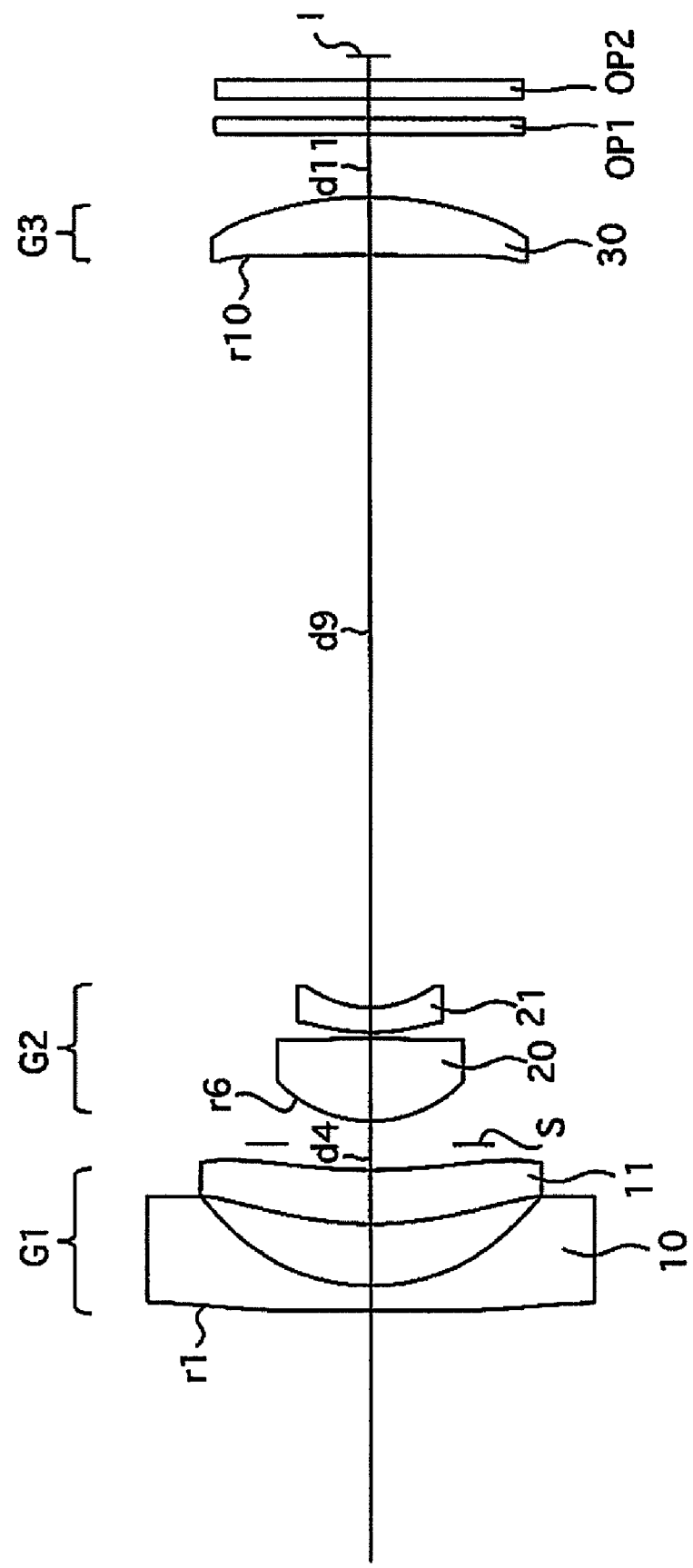

Fig. 2A
FNO.=1:5.95
——— d-line
········· g-line
– – – C-line
–·–·– F-line
— — e-line
-0.5    0.5
Aspherical Aberration
Chromatic Aberration
Fig. 2B
Y=3.875mm
-0.05    0.05
Lateral Chromatic
Aberration
Fig. 2C
Y=3.875mm
——— S
– – M
-0.5    0.5
Astigmatism
Fig. 2D
Y=3.875mm
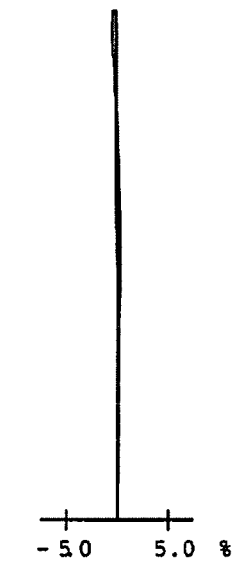
-5.0    5.0 %
Distortion
Fig. 3A  Y= 0.00  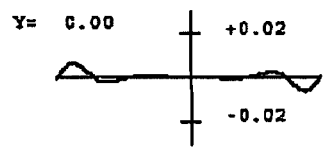
Fig. 3B  Y= 0.78  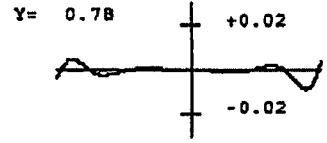
Fig. 3C  Y= 1.55  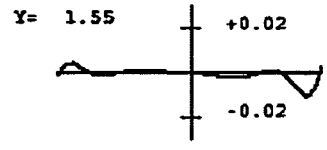
Fig. 3D  Y= 2.32  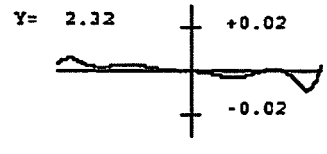
Fig. 3E  Y= 3.10  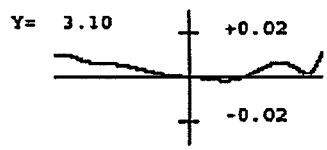
Fig. 3F  Y= 3.49  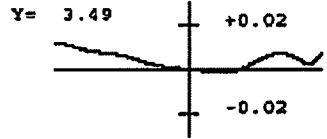
Fig. 3G  Y= 3.88  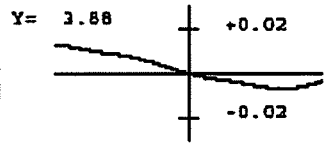
Fig. 3H  Y= 4.07  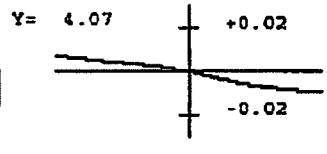
——— d-line

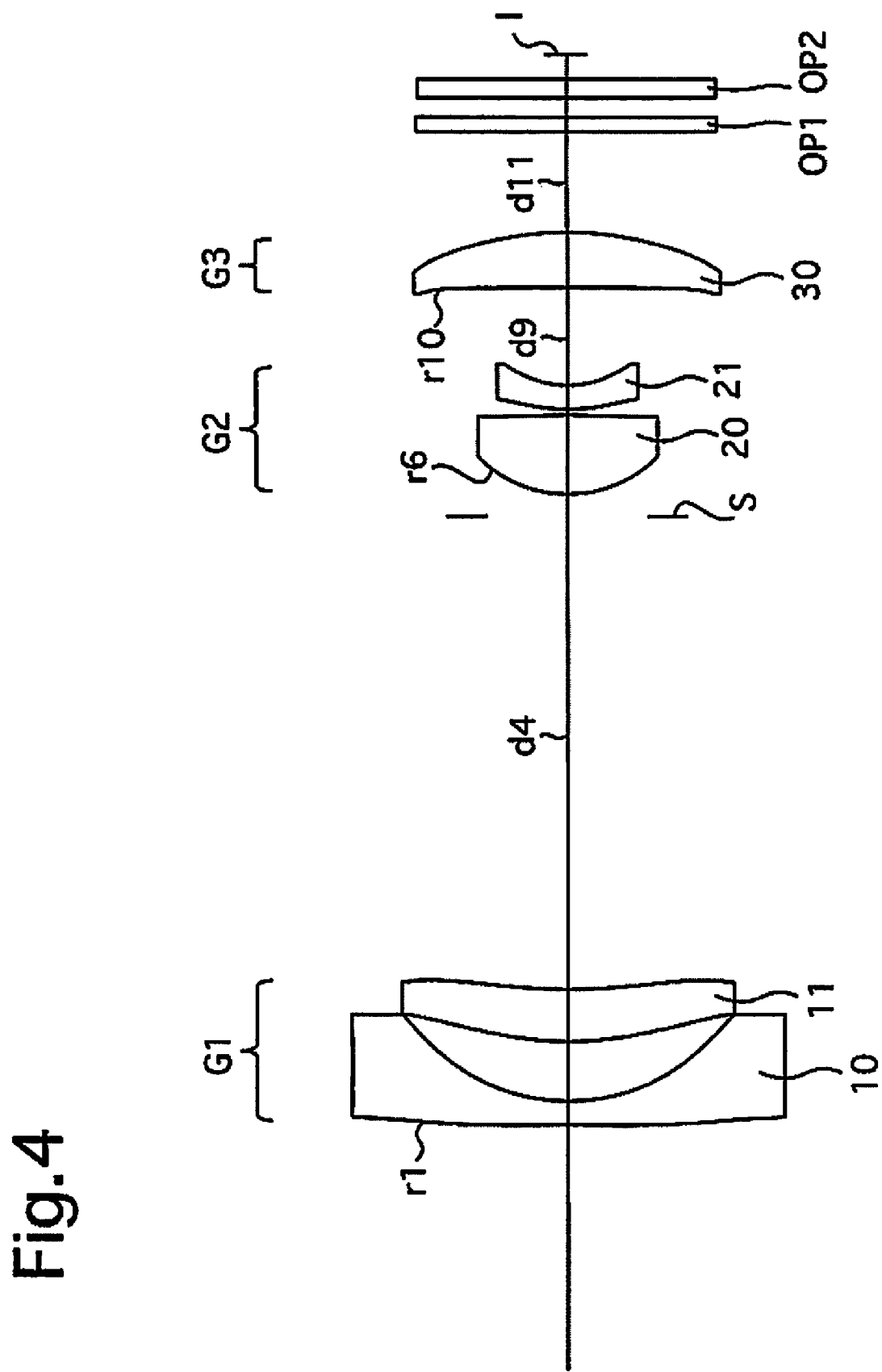

Fig. 5A  Fig. 5B  Fig. 5C  Fig. 5D
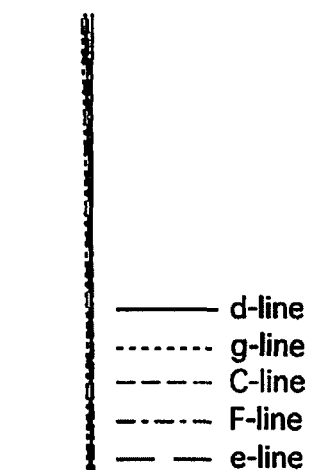
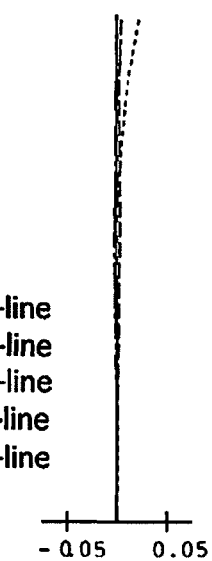
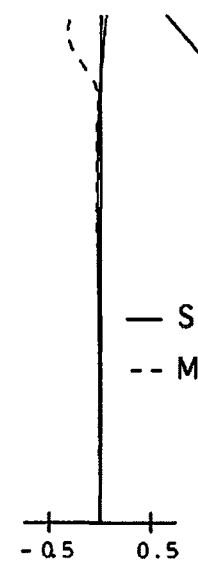
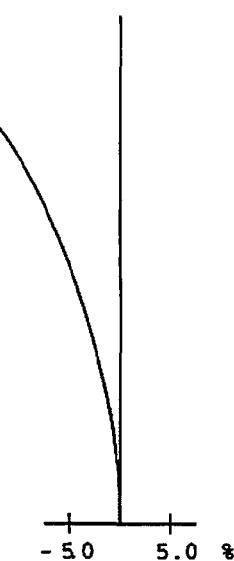
Aspherical Aberration  Lateral Chromatic  Astigmatism  Distortion
Chromatic Aberration  Aberration
Fig. 6A 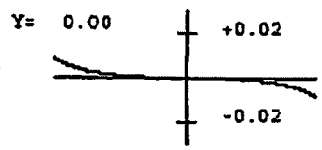  Fig. 6E 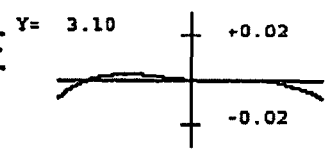
Fig. 6B 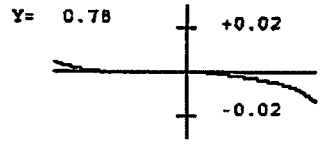  Fig. 6F 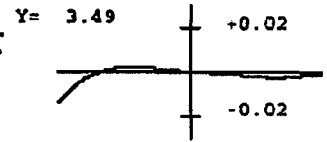
Fig. 6C 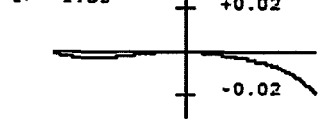  Fig. 6G 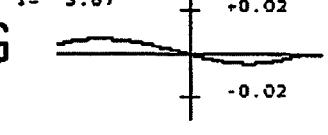
Fig. 6D 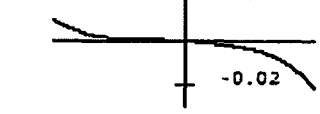  Fig. 6H 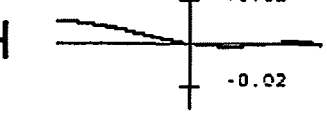
——— d-line

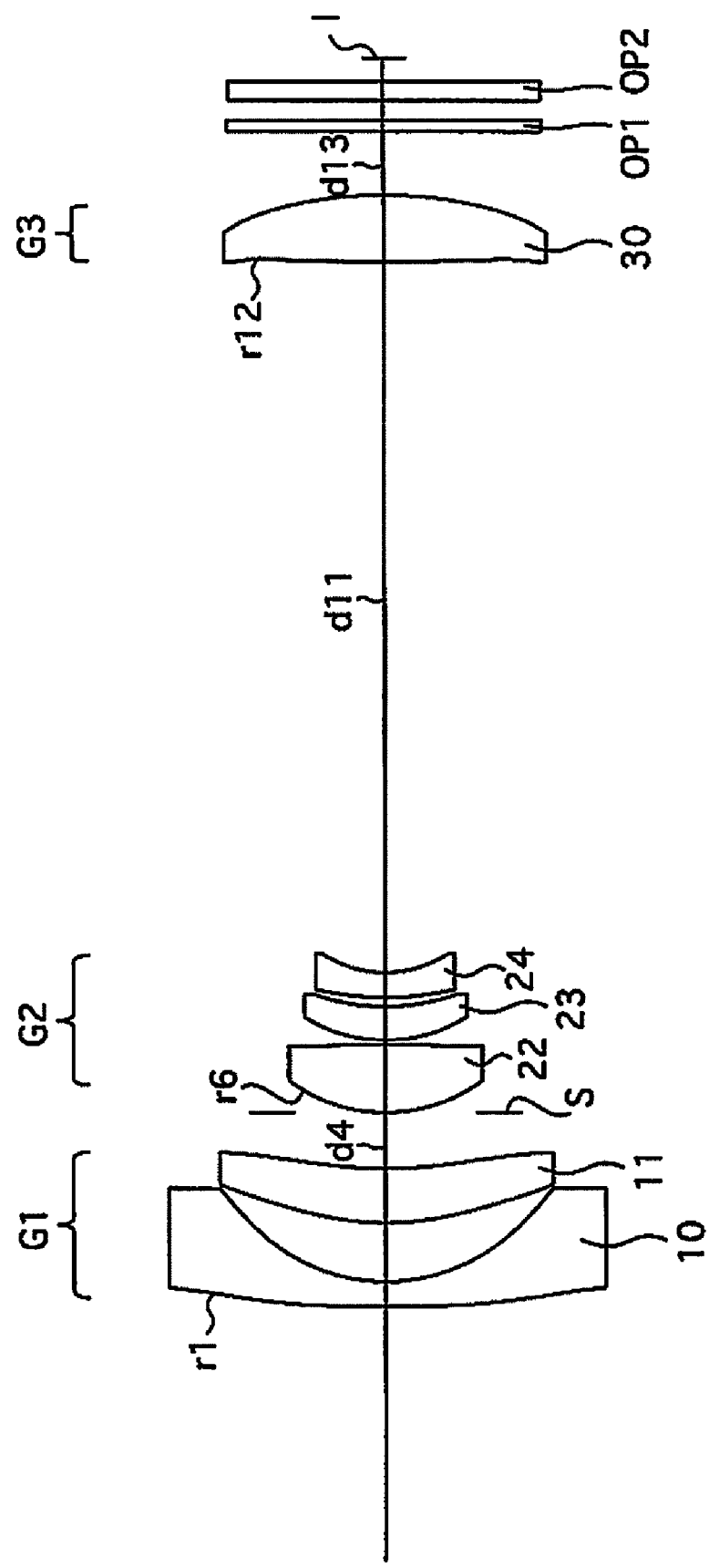

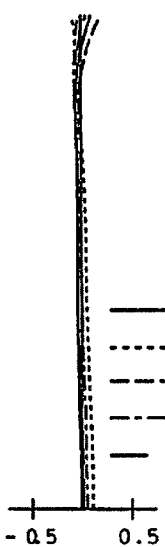
Fig. 8A
FNO.=1:5.95
—— d-line
········ g-line
– – – C-line
–·–·– F-line
— — e-line
-0.5   0.5
Aspherical Aberration
Chromatic Aberration
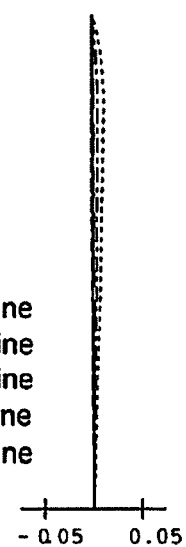
Fig. 8B
Y=3.875mm
-0.05   0.05
Lateral Chromatic
Aberration
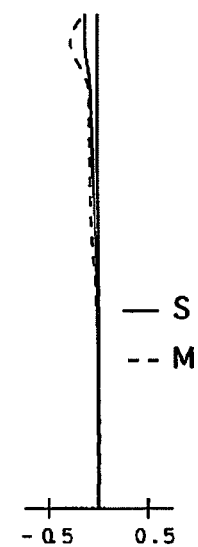
Fig. 8C
Y=3.875mm
— S
-- M
-0.5   0.5
Astigmatism
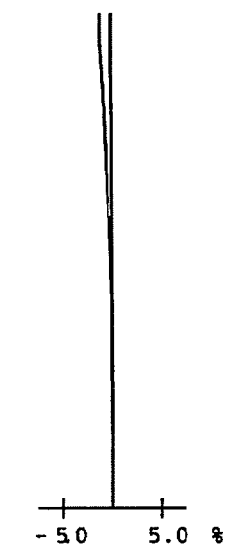
Fig. 8D
Y=3.875mm
-5.0   5.0 %
Distortion
Fig. 9A  Y= 0.00 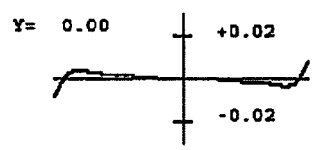
Fig. 9B  Y= 0.78 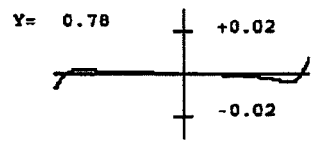
Fig. 9C  Y= 1.55 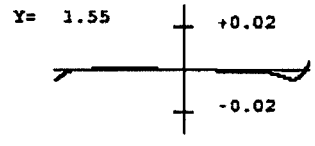
Fig. 9D  Y= 2.32 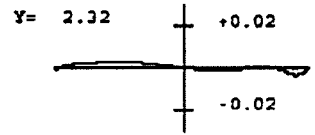
Fig. 9E  Y= 3.10 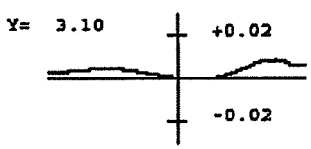
Fig. 9F  Y= 3.49 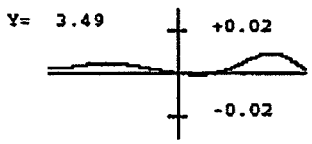
Fig. 9G  Y= 3.88 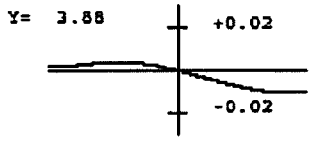
—— d-line

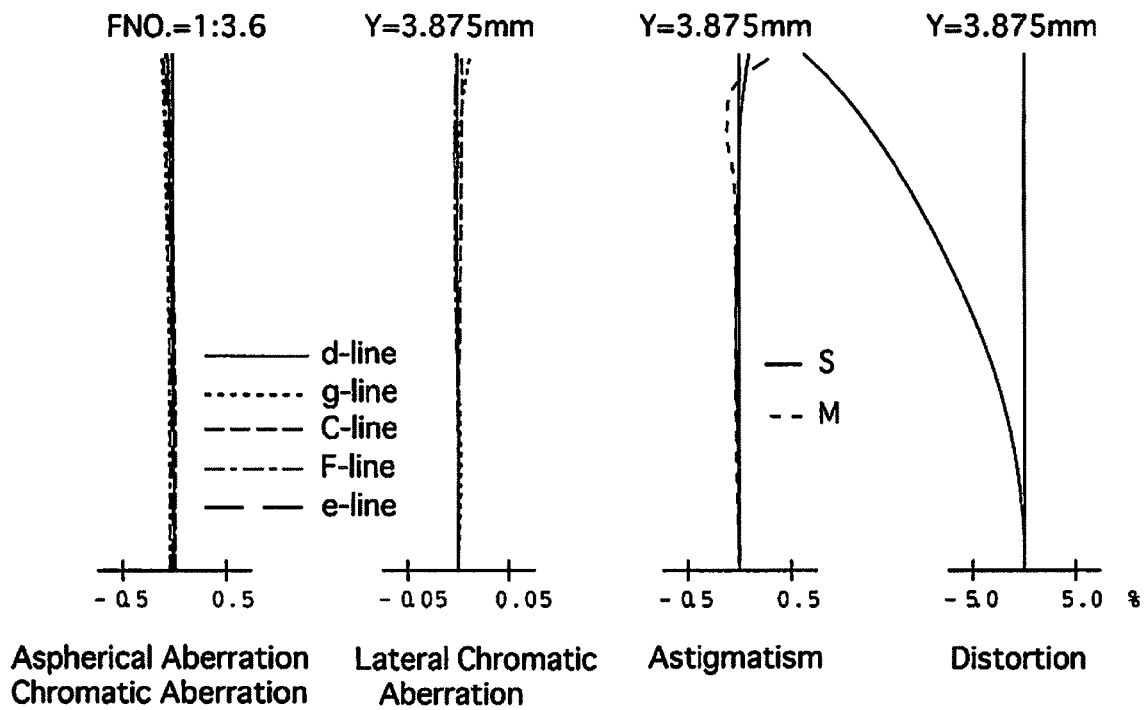
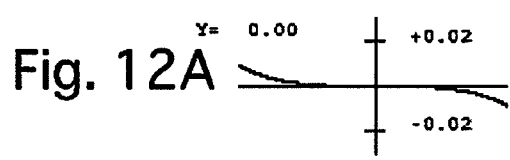
Fig. 12A
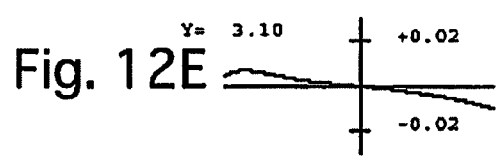
Fig. 12E
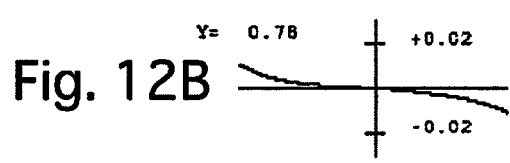
Fig. 12B
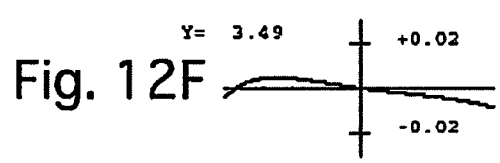
Fig. 12F
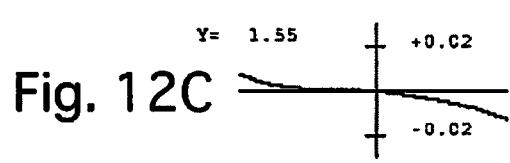
Fig. 12C
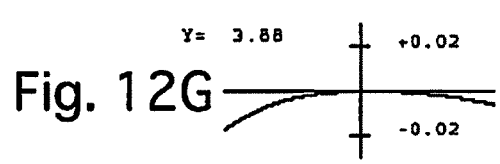
Fig. 12G
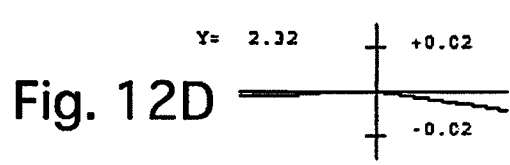
Fig. 12D

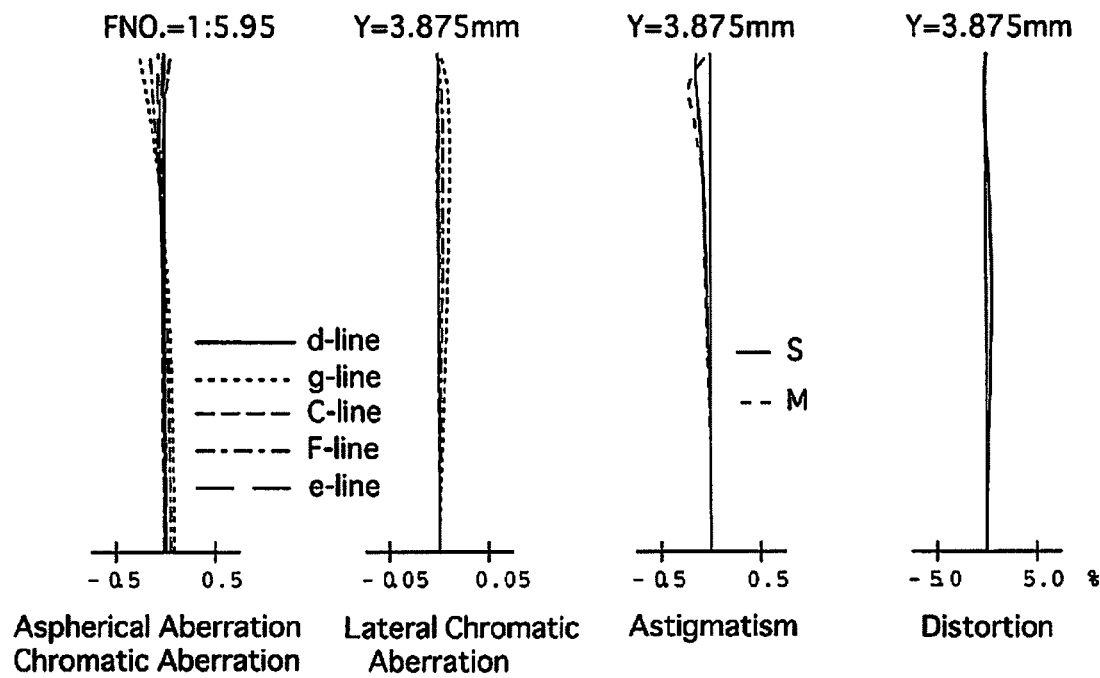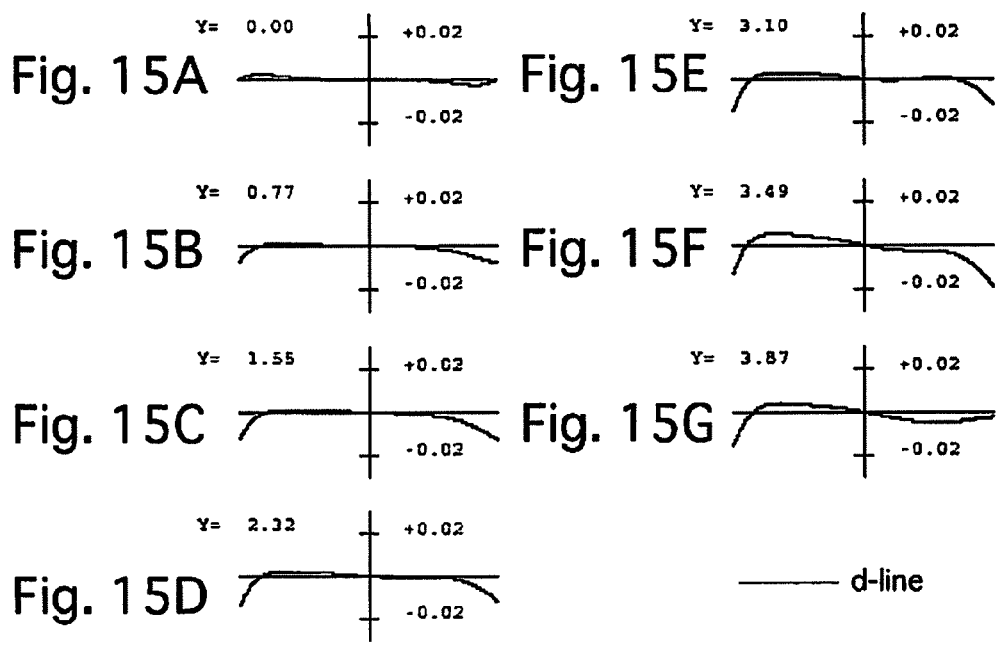

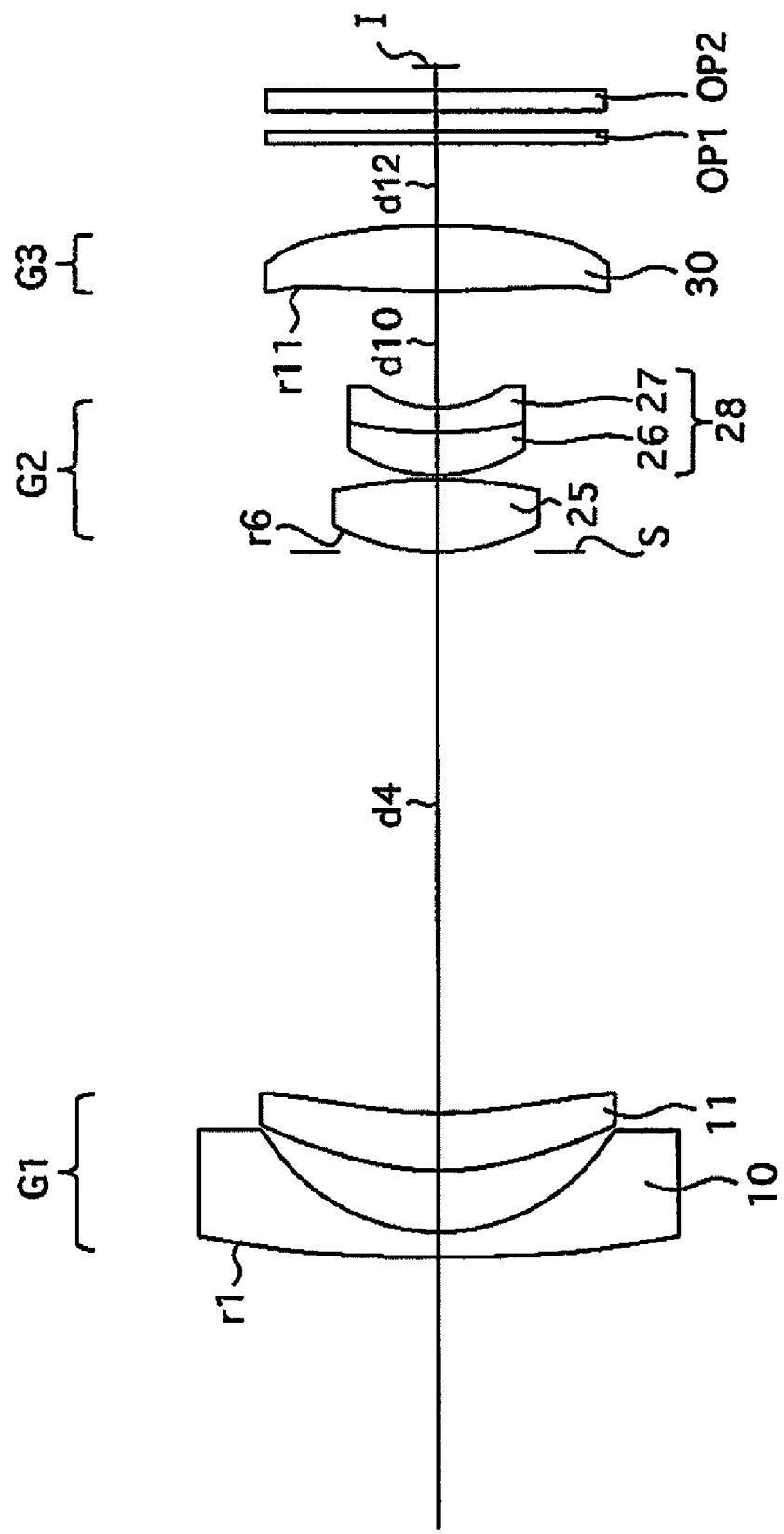

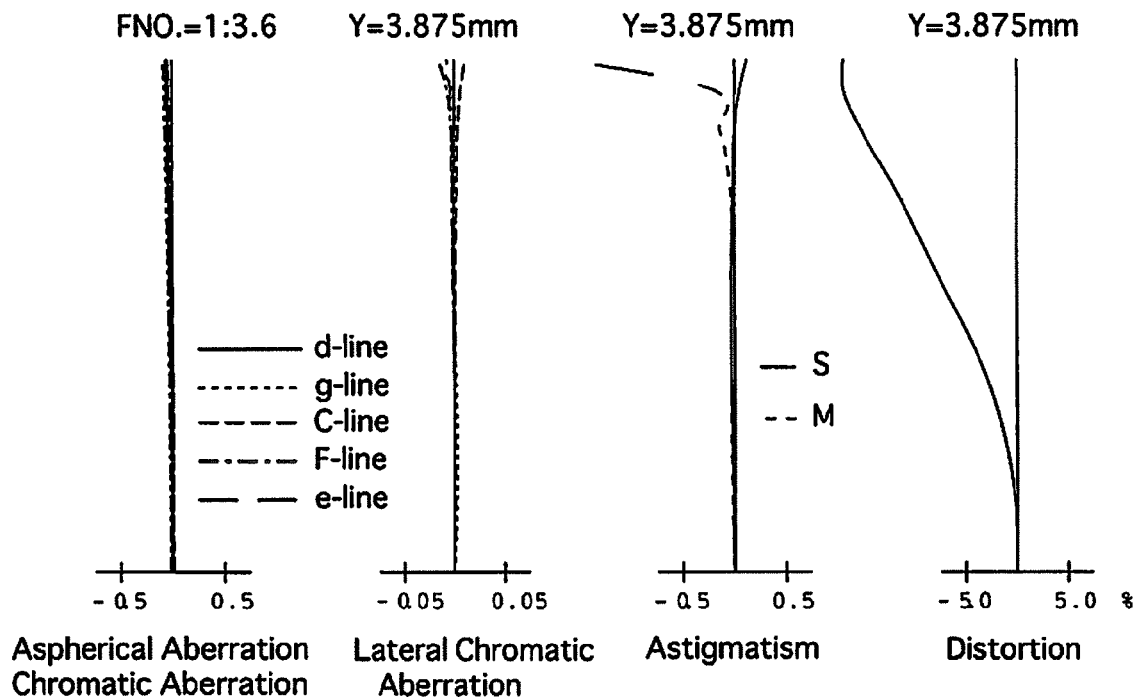

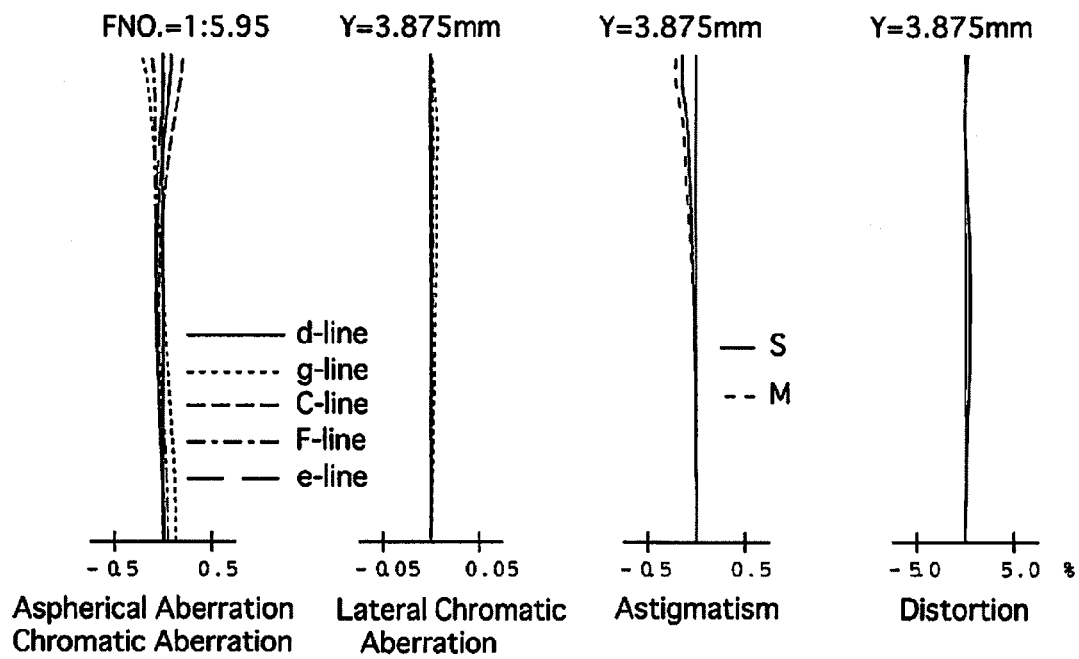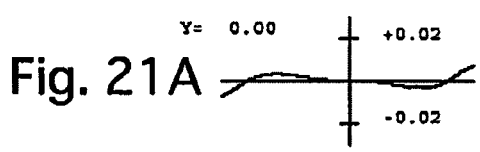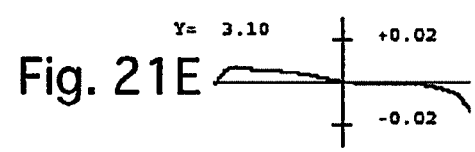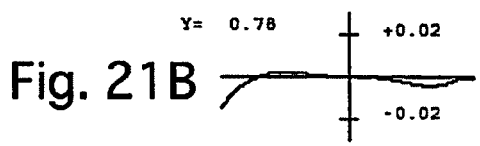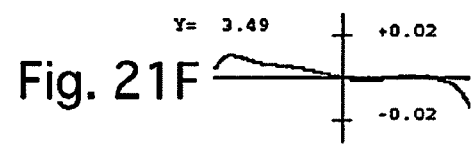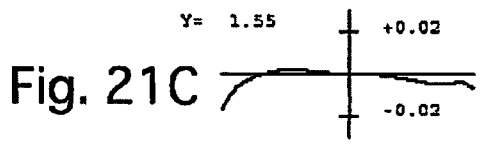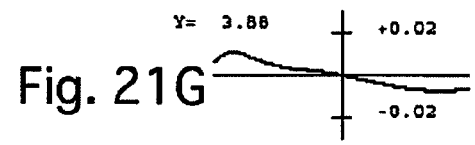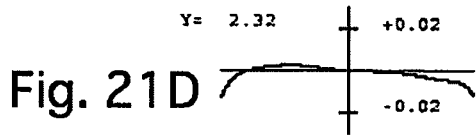

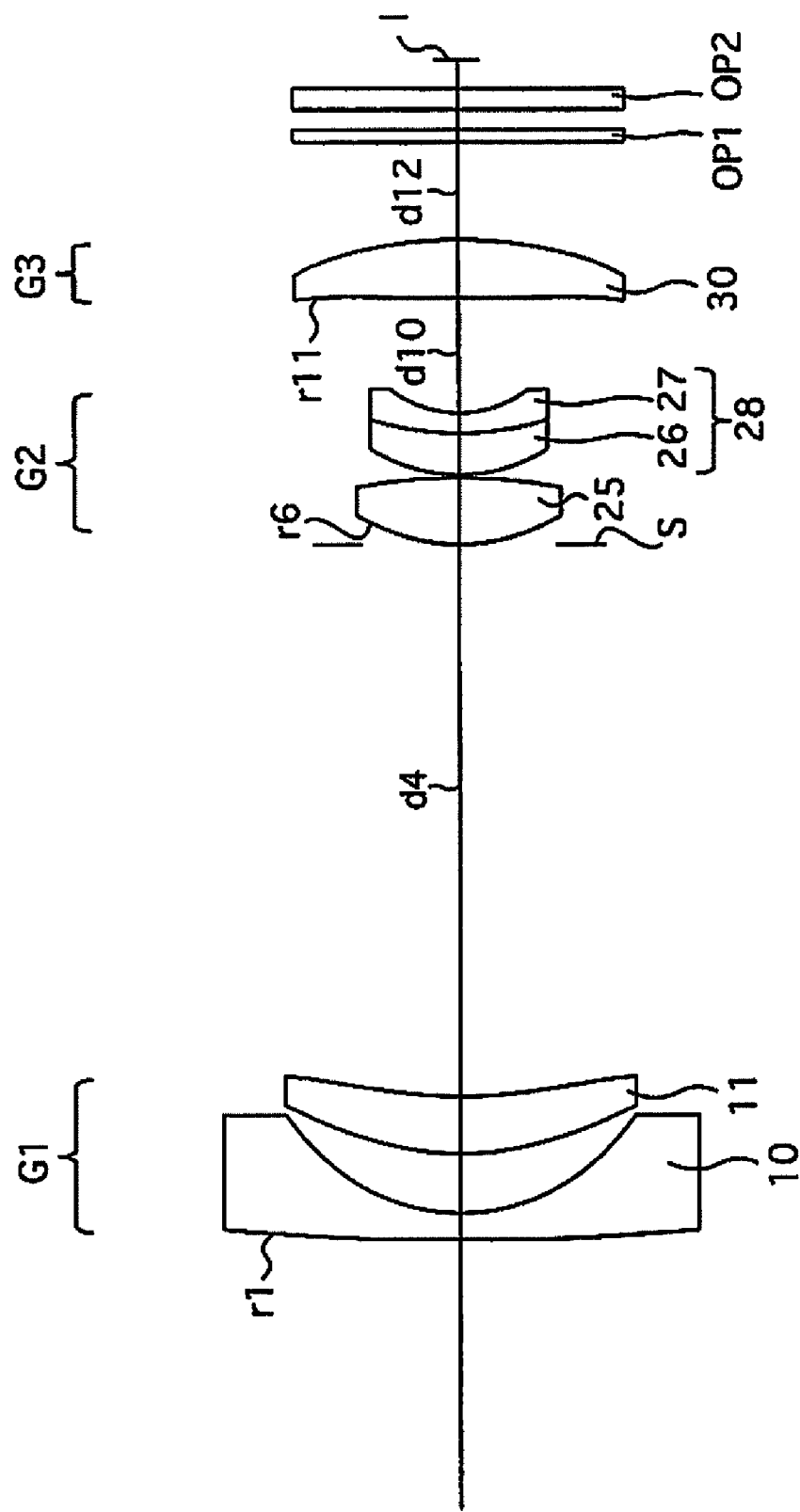

FNO.=1:3.6

—— d-line
------ g-line
— — C-line
—·—·— F-line
— — e-line

-0.5  0.5

Aspherical Aberration
Chromatic Aberration

Y=3.875mm

-0.05  0.05

Lateral Chromatic
Aberration

Y=3.875mm

— S
-- M

-0.5  0.5

Astigmatism

Y=3.875mm

-5.0  5.0 %

Distortion

—— d-line

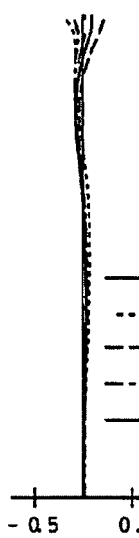
Fig. 26A
FNO.=1:5.95
—— d-line
········ g-line
---- C-line
-·-·- F-line
— — e-line
-0.5  0.5
Aspherical Aberration
Chromatic Aberration
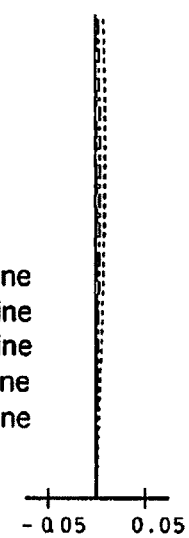
Fig. 26B
Y=3.875mm
-0.05  0.05
Lateral Chromatic
Aberration
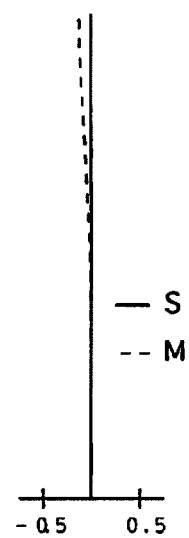
Fig. 26C
Y=3.875mm
— S
-- M
-0.5  0.5
Astigmatism
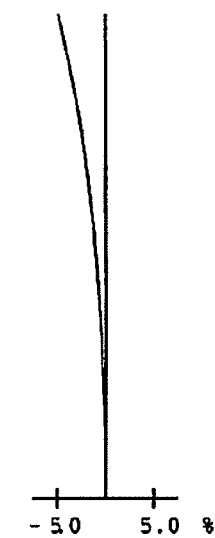
Fig. 26D
Y=3.875mm
-5.0  5.0 %
Distortion
Fig. 27A  Y= 0.00 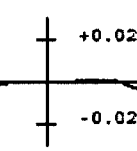
Fig. 27B  Y= 0.78 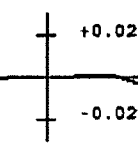
Fig. 27C  Y= 1.55 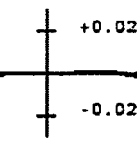
Fig. 27D  Y= 2.32 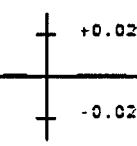
Fig. 27E  Y= 3.10 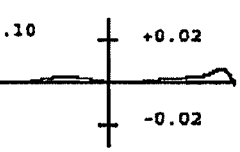
Fig. 27F  Y= 3.49 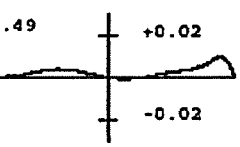
Fig. 27G  Y= 3.88 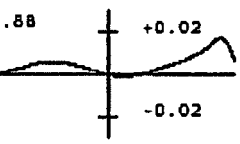
—— d-line

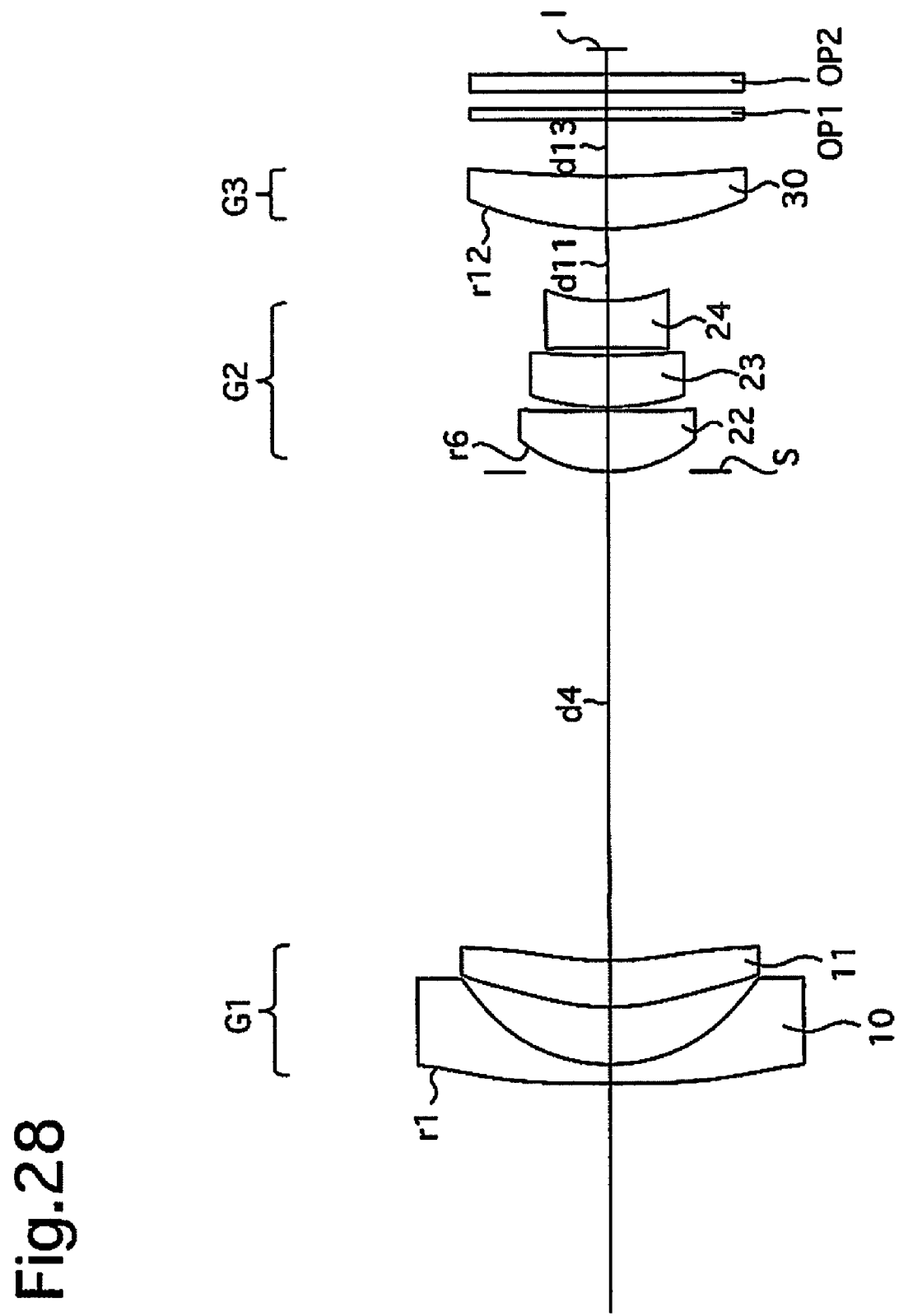

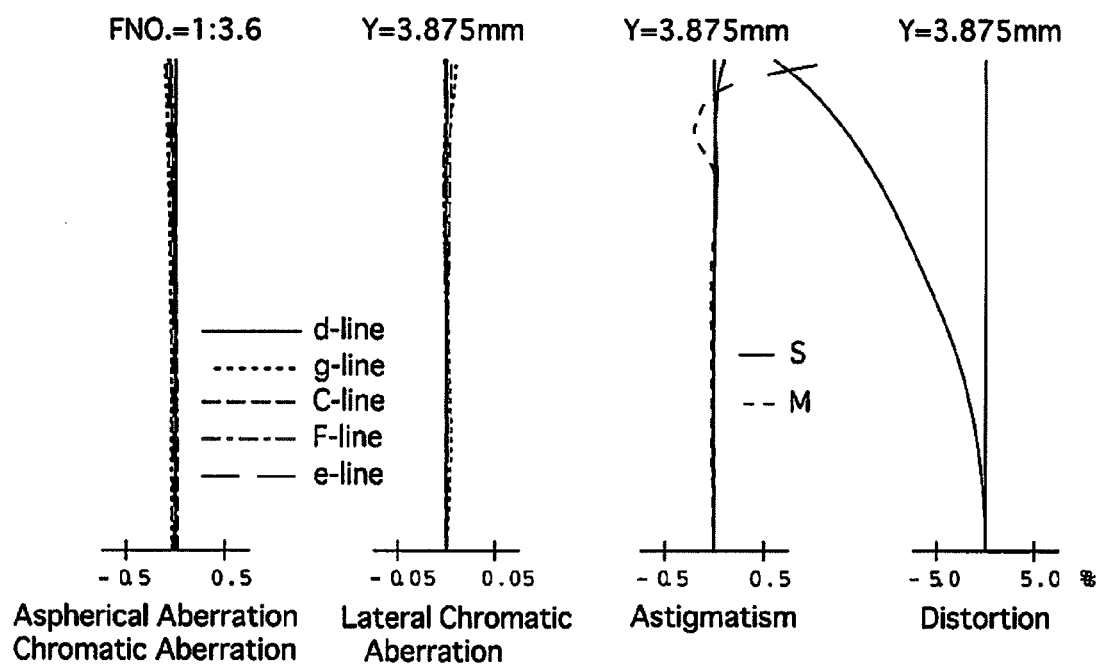
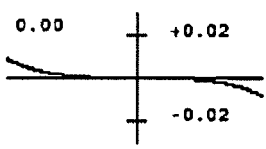 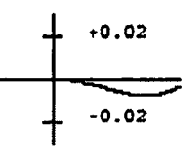
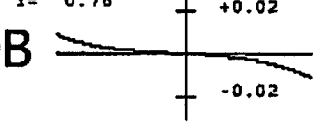 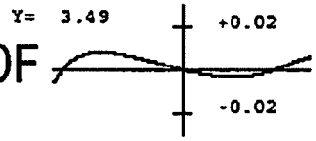
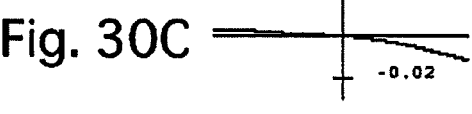 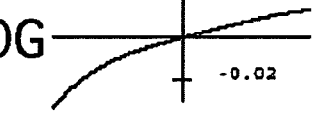

ZOOM LENS SYSTEM

BACKGROUND OF THE INVENTION

1. Field of the Invention

The present invention relates to a zoom lens system that is provided for imaging.

2. Description of Related Art

In the field of manufactured products such as photographic cameras, electronic still cameras and video cameras, it has become standard practice in recent years to use a zoom lens system. Furthermore, even in the past it has always been common for the market to demand a higher optical quality, a higher zoom-ratio, and compactness.

Types of zoom lens systems having various refractive-power distributions depending on the magnification and use, are known in the art. As examples of a compact and high-quality type of zoom lens system, a zoom lens system arrangement having three lens groups, i.e., a negative first lens group, a positive second lens group and a positive third lens group, in that order from the object side, is disclosed in Japanese Unexamined Patent Publication Nos. 2004-239973, 2008-203881, 2008-203449 and 2008-241794.

However, such a zoom lens system that has three lens groups, i.e., a negative lens group, a positive lens group and a positive lens group, in that order from the object side, typically only has a small zoom ratio and is not very suitable for obtaining a higher zoom ratio while maintaining compactness. In order to achieve a high zoom ratio and compactness with such an arrangement, it becomes imperative to reduce the amount of movement of each lens group by strengthening the refractive power of each lens group. The refractive-power distribution in regard to the second lens group, which carries the major burden for zooming, is particularly important. Hence, increasing the refractive power of the second lens group, so that the amount of movement of the second lens group that occurs during zoom decreases, contributes greatly to achieving a compact zoom lens system. However, if the refractive power of each lens group is strengthened, aberration fluctuations also increase in each lens group during zooming, so that it typically becomes difficult to achieve a zoom lens system having a high optical quality throughout the entire zooming range.

For example, in the aforementioned Japanese Unexamined Patent Publication Nos. 2004-239973 and 2008-203881, since the refractive power and magnification setting of the second lens group is unsuitable, the amount of movement of the second lens group from the short focal length extremity (wide-angle extremity) to the long focal length extremity (telephoto extremity) is large, which causes an increase in the overall length of the zoom lens system. Furthermore, although the zoom lens system disclosed in aforementioned Japanese Unexamined Patent Publication No. 2008-203449 is extremely compact, since the refractive power and magnification setting of the second lens group is likewise unsuitable, the zoom ratio thereof is less than 3:1. Moreover, the zoom lens system disclosed in aforementioned Japanese Unexamined Patent Publication No. 2008-241794 achieves a high zoom ratio of 6:1, however, the overall length of the zoom lens system from the short focal length extremity to the long focal length extremity is enlarged. In this example also, the insufficient magnification of the second lens group, especially the magnification at the long focal length extremity, causes an enlarged overall length of the zoom lens system.

Furthermore, on the other hand, the demand for telecentricity in digital cameras of recent years can be cited as a reason for hindering compactness. Ideal telecentricity of a lens system is defined as when the principal rays at every angle-of-view are incident on the image sensor at a perpendicular angle thereto, and therefore, since such an arrangement takes away freedom of design, this often conflicts with achieving a compact lens system. In the zoom lens systems disclosed in aforementioned Japanese Unexamined Patent Publication Nos. 2004-239973 and 2008-203881, since the rearmost lens element (closest to the image side) within the second lens group has a positive refractive power, the height of the light bundle that is incident onto the third lens group is low, so that it becomes difficult to obtain telecentricity. Hence, it is difficult to achieve a zoom lens system which has three lens groups that exhibit both a high zoom-ratio and compactness.

Furthermore, in general, when designing a zoom lens system having a multiple number of lens groups, if the refractive power of each lens group is strengthened and the number of lens elements is decreased due to the pursuit of compactness and of a high zoom-ratio (high performance), the remaining amount of aberration at each lens group increases, or the amount of aberration fluctuations that occur during zooming increases, so that it becomes extremely difficult to achieve a sufficient optical quality together with a sufficient compactness and a sufficiently high zoom-ratio.

SUMMARY OF THE INVENTION

The present invention has been devised in view of the above described problems, and provides a zoom lens system in which three lens groups, i.e., a negative lens group, a positive lens group and a positive lens group, are employed, has a high zoom-ratio, is compact, and achieves a superior optical quality.

According to an aspect of the present invention, a zoom lens system is provided, including a negative first lens group, a positive second lens group and a positive third lens group, in that order from the object side, wherein a distance in the optical axis direction between each lens group changes during zooming from the short focal length extremity to the long focal length extremity, and wherein the following conditions (1) and (2) are satisfied:

$$0.20 < F2/Ft < 0.45 \tag{1}, \text{and}$$

$$-3.00 < F2/fm < -1.00 \tag{2},$$

wherein F2 [mm] designates the combined focal length of the second lens group, Ft [mm] designates the focal length of the entire the zoom lens system at the long focal length extremity, fm [mm] designates the focal length of the surface on the image side of the lens element that is provided closest to the image side within the second lens group, fm=(1−nm)/rm, nm designates the refractive index at the d-line of the lens element that is provided closest to the image side within the second lens group, and rm [mm] designates the radius of curvature of the surface on the image side of the lens element that is provided closest to the image side within the second lens group.

It is desirable for the following condition (3) to be satisfied:

$$-0.25 < (m2t - m2w)/(2GLt - 2GLw) < -0.10 \tag{3},$$

wherein m2t designates the magnification with respect to an object at infinity at the long focal length extremity of the second lens group, m2w designates the magnification with respect to an object at infinity at the short focal length extremity of the second lens group, 2GLt designates the distance from the surface on the object side of the lens element that is provided closest to the object side within the second lens group to the image plane at the long focal length extremity, and 2GLw designates the distance from the surface on the object side of the lens element that is provided closest to the object side within said second lens group to the image plane at the short focal length extremity.

It is desirable for the first lens group to include a negative lens element and a positive lens element, in that order from the object side.

It is desirable for the second lens group to include at least a positive lens element and a negative lens element, in that order from the object side.

It is desirable for the second lens group to include a positive lens element, a positive lens element and a negative lens element, in that order from the object side.

The positive lens element that is provided on the image side, within the second lens group, and the negative lens element of the second lens group can be bonded to each other to form a cemented lens.

It is desirable for the third lens group to be one positive lens element.

According to the present invention, a zoom lens system is provided in which three lens groups, i.e., a negative lens group, a positive lens group and a positive lens group, are employed, which having a high zoom-ratio, being compact, and achieving a superior optical quality.

The present disclosure relates to subject matters contained in Japanese Patent Application No. 2010-18039 (filed on Jan. 29, 2010) and No. 2010-237418 (filed on Oct. 22, 2010) which are expressly incorporated herein in their entirety.

BRIEF DESCRIPTION OF THE DRAWINGS

The present invention will be discussed below in detail with reference to the accompanying drawings, in which:

FIG. 1 shows a lens arrangement of a first numerical embodiment of the zoom lens system, according to the present invention, at the long focal length extremity when focused on an object at infinity;

FIGS. 2A, 2B, 2C and 2D show various aberrations that occurred in the lens arrangement shown in FIG. 1;

FIGS. 3A through 3H show lateral aberrations that occurred in the lens arrangement shown in FIG. 1;

FIG. 4 shows a lens arrangement of the first numerical embodiment of the zoom lens system at the short focal length extremity when focused on an object at infinity;

FIGS. 5A, 5B, 5C and 5D show various aberrations that occurred in the lens arrangement shown in FIG. 4;

FIGS. 6A through 6H show lateral aberrations that occurred in the lens arrangement shown in FIG. 4;

FIG. 7 shows a lens arrangement of a second numerical embodiment of the zoom lens system, according to the present invention, at the long focal length extremity when focused on an object at infinity;

FIGS. 8A, 8B, 8C and 8D show various aberrations that occurred in the lens arrangement shown in FIG. 7;

FIGS. 9A through 9G show lateral aberrations that occurred in the lens arrangement shown in FIG. 7;

FIGS. 11A, 11B, 11C and 11D show various aberrations that occurred in the lens arrangement shown in FIG. 10;

FIGS. 12A through 12G show lateral aberrations that occurred in the lens arrangement shown in FIG. 10;

FIGS. 14A, 14B, 14C and 14D show various aberrations that occurred in the lens arrangement shown in FIG. 13;

FIGS. 15A through 15G show lateral aberrations that occurred in the lens arrangement shown in FIG. 13;

FIG. 16 shows a lens arrangement of the third numerical embodiment of the zoom lens system at the short focal length extremity when focused on an object at infinity;

FIGS. 17A, 17B, 17C and 17D show various aberrations that occurred in the lens arrangement shown in FIG. 16;

FIGS. 18A through 18G show lateral aberrations that occurred in the lens arrangement shown in FIG. 16;

FIGS. 20A, 20B, 20C and 20D show various aberrations that occurred in the lens arrangement shown in FIG. 19;

FIGS. 21A through 21G show lateral aberrations that occurred in the lens arrangement shown in FIG. 19;

FIG. 22 shows a lens arrangement of the fourth numerical embodiment of the zoom lens system at the short focal length extremity when focused on an object at infinity;

FIGS. 24A through 24G show lateral aberrations that occurred in the lens arrangement shown in FIG. 22;

FIGS. 26A, 26B, 26C and 26D show various aberrations that occurred in the lens arrangement shown in FIG. 25;

FIGS. 27A through 27G show lateral aberrations that occurred in the lens arrangement shown in FIG. 25;

FIG. 28 shows a lens arrangement of the fifth numerical embodiment of the zoom lens system at the short focal length extremity when focused on an object at infinity;

FIGS. 29A, 29B, 29C and 29D show various aberrations that occurred in the lens arrangement shown in FIG. 28;

FIGS. 30A through 30G show lateral aberrations that occurred in the lens arrangement shown in FIG. 28.

DESCRIPTION OF THE PREFERRED EMBODIMENTS

Figure 31:
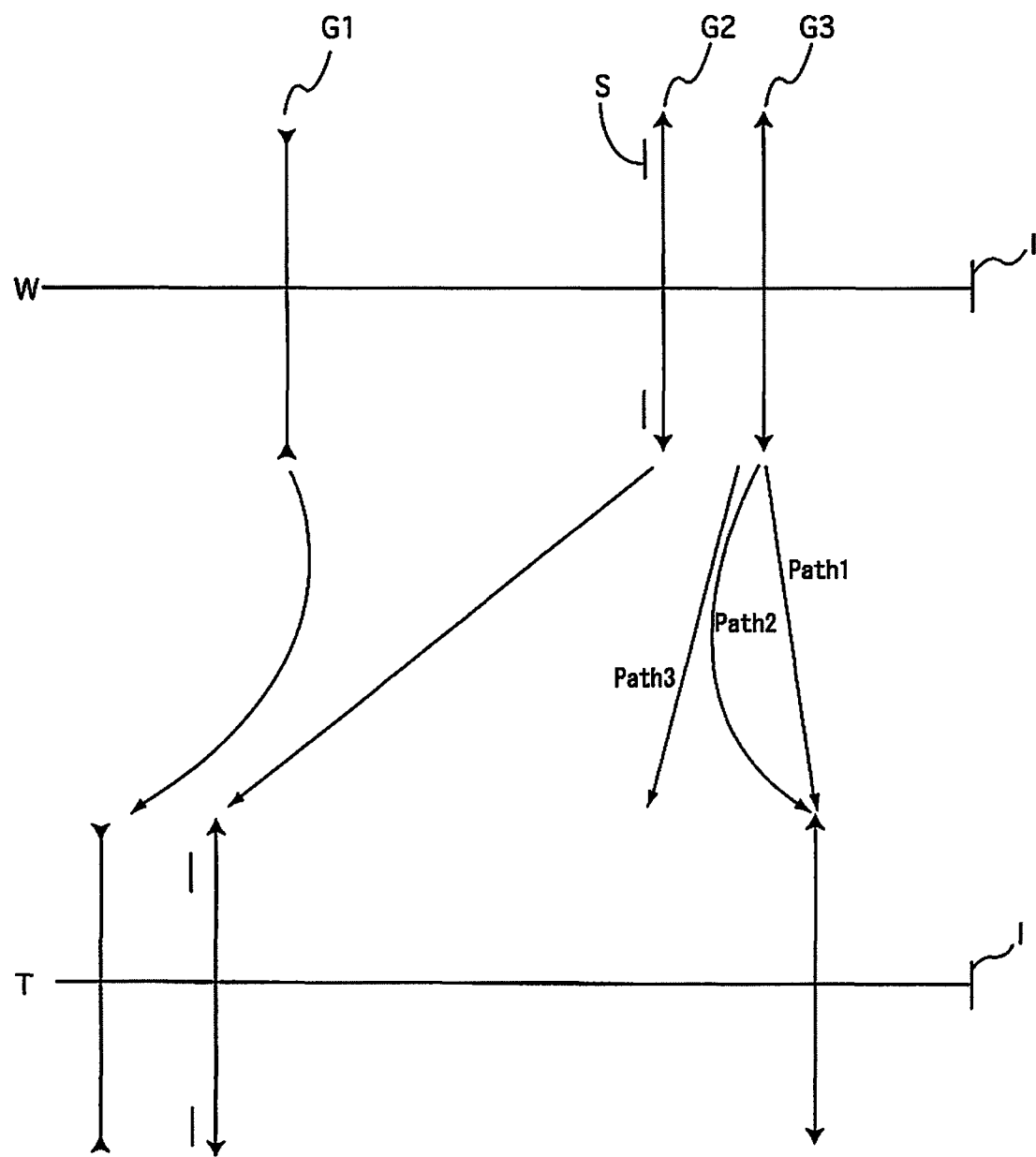
FIG. 31 shows a zoom path of the zoom lens system according to the present invention.

The zoom lens system according to the present invention is, as shown in the zoom path diagram of FIG. 31, configured of a negative first lens group G1, a positive second lens group G2, and a positive third lens group G3, in that order from the object side. A diaphragm S is provided in between the first lens group G1 and the second lens group G2, and moves integrally with the second lens group G2 during zooming. "I" designates the image plane.

Upon zooming from the short focal length extremity (W) to the long focal length extremity (T), the first through third lens groups G1 through G3 move along the optical axis so that the distance between the first lens group G1 and the second lens group G2 decreases, and the distance between the second lens group G2 and the third lens group G3 increases.

More specifically, upon zooming from the short focal length extremity (W) to the long focal length extremity (T), the first lens group G1 moves, overall, toward the object side, and the second lens group G2 moves monotonically toward the object side. In the first numerical embodiment, the third lens group G3 moves monotonically toward the image side (path 1), in the second through fourth numerical embodiments, the third lens group G3 first moves toward the object side and thereafter moves toward the image side (path 2), and in the fifth numerical embodiment, the third lens group G3 moves monotonically toward the object side (path 3).

The first lens group G1 is configured of a negative lens element 10 and a positive lens element 11, in that order from the object side. The negative lens element 10 can be either a biconcave negative lens element (first numerical embodiment) or a negative meniscus lens element having a convex surface on the object side (second through fifth numerical embodiments), and has an aspherical surface on each side thereof. The positive lens element 11, in all of the numerical embodiments, is formed as a positive meniscus lens element having a convex surface on the object side, and has an aspherical surface on each side thereof.

The second lens group G2 includes at least a positive lens element and a negative lens element, in that order from the object side.

In the first numerical embodiment, the second lens group G2 is configured of a biconvex positive lens element 20 and a negative meniscus lens element 21 having a convex surface on the object side, in that order from the object side. The biconvex positive lens element 20 and the negative meniscus lens element 21 each have an aspherical surface on both sides thereof.

In the second and fifth numerical embodiments, the second lens group G2 is configured of a positive lens element 22, a positive lens element 23, and a negative lens element 24, in that order from the object side. The positive lens element 22 is a biconvex positive lens element and has an aspherical surface on each side thereof. The positive lens element 23 is a positive meniscus lens element having a convex surface on the object side, and is a spherical lens (i.e., not an aspherical lens). The negative lens element 24 is either a negative meniscus lens element having a convex surface on the object side (second numerical embodiment) or a biconcave negative lens element (fifth numerical embodiment), and has an aspherical surface on each side thereof.

In the third and fourth embodiments, the second lens group G2 is configured of a biconvex positive lens element 25, and a cemented lens 28 formed from a positive meniscus lens element 26 having a convex surface on the object side and a negative meniscus lens element 27 having a convex surface on the object side, in that order from the object side. The biconvex positive lens element 25 has an aspherical surface on each side thereof. The positive meniscus lens element 26 also has an aspherical surface on the object side thereof.

The third lens group G3 is configured of a single positive lens element 30. The positive lens element 30 is either a positive meniscus lens element having a convex surface on the image side (first numerical embodiment), a biconvex positive lens element (second through fourth numerical embodiments), or a positive meniscus lens element having a convex surface on the object side (fifth numerical embodiment), and has an aspherical surface on each side thereof.

In the zoom lens system of the present invention, the balance of the refractive power of each lens group is appropriately set, a high zoom-ratio is achieved, and the zoom lens system is compact. Furthermore, the zoom lens system is configured so that aberration fluctuations over the entire zooming range are favorably suppressed while achieving a favorable optical quality. Furthermore, by optimizing the refractive power and the zooming amount during movement of the second lens group G2, the space (distance) that is mainly required by the second lens group G2 during zooming can be reduced; and by providing the rearmost lens element (the lens element closest to the image side) within the second lens group G2 with a negative refractive power, the height at which the off-axis rays at mainly the short focal length extremity is made incident onto the third lens group G3 can be increased, so that telecentricity can be obtained, and further compactness can be achieved by reducing the distance between the second lens group G2 and the third lens group G3.

Condition (1) specifies the refractive-power balance of the second lens group G2 by the ratio of the combined focal length of the second lens group G2 to the focal length of the entire zoom lens system at the long focal length extremity, and is a necessary condition for achieving a high zoom-ratio while achieving a favorable balance between the optical quality and the compactness of the zoom lens system.

If the upper limit of condition (1) is exceeded, the refractive power of the second lens group G2 becomes too weak, the amount of movement of the second lens group G2 during zooming from the short focal length extremity to the long focal length extremity becomes large, and compactness of the zoom lens system is hindered. Furthermore, the focal length of the entire zoom lens system becomes too short at the long focal length extremity, and the zoom ratio becomes low.

If the lower limit of condition (1) is exceeded, the refractive power of the second lens group G2 becomes too strong, the amount of movement of the second lens group G2 during zooming from the short focal length extremity to the long focal length extremity becomes small, which is desirable in regard to compactness of the zoom lens system, however, the amount of aberration fluctuations during zooming increase so that it becomes difficult to achieve a favorable optical quality throughout the entire zooming range.

Condition (2) specifies the proportion of the focal length of the surface on the image side of the lens element that is provided closest to the image side within the second lens group G2 with respect to the combined focal length of the second lens group G2, and is a necessary condition for achieving a favorable balance between telecentricity, compactness, and the optical quality of the zoom lens system.

If the upper limit of condition (2) is exceeded, the refractive power of the surface on the image side of the lens element that is provided closest to the image side within the second lens group G2 becomes too weak, the abaxial light bundle cannot be made incident onto the third lens group G3 at the (outer peripheral) portion that is distant from the optical axis, and the telecentricity at the short focal length extremity, in particular, deteriorates. If the distance between the second lens group G2 and the third lens group G3 is increased in order to improve the telecentricity, the compactness of the zoom lens system is unfavorably hindered.

If the lower limit of condition (2) is exceeded, the refractive power of the second lens group G2 becomes too weak, the amount of movement of the second lens group G2 during zooming increases, so that achieving a compact zoom lens system is hindered. Furthermore, the axial chromatic aberration becomes over-corrected, so that it becomes difficult to achieve a favorable optical quality.

Condition (3) is a condition necessary for achieving a balance between the zooming efficiency and optical quality per unit amount of movement of the second lens group G2 and the manufacturability thereof.

If the upper limit of condition (3) is exceeded, the amount of movement of the second lens group G2 during zooming becomes large, and therefore hinders the compactness of the zoom lens system.

If the lower limit of condition (3) is exceeded, since the refractive power of the second lens group G2 becomes too strong, aberration fluctuations during zooming increase, and the optical quality throughout the entire zooming range deteriorates. Furthermore, manufacture of the second lens group G2 becomes difficult due to the manufacturing sensitivity also undesirably increasing.

EMBODIMENTS

Specific numerical embodiments will be herein discussed. The following numerical embodiments correspond to a zoom lens system used in a photographic camera, an electronic still camera or a video camera. In the various aberration diagrams, the lateral aberrations diagrams and the tables, the d-line, g-line, C-line, F-line and e-line show aberrations at their respective wave-lengths; S designates the sagittal image, M designates the meridional image, FNO. designates the f-number, f designates the focal length of the entire optical system, W designates the half angle of view (°), Y designates the image height, fB designates the backfocus, L designates the overall length of the lens system, r designates the radius of curvature, d designates the lens thickness or distance between lenses, N(d) designates the refractive index of the d-line, and ν d designates the Abbe's number at the d-line. The values for the f-number, the focal length, the half angle-of-view, the image height, the backfocus, and the distance between lenses (which changes during zooming and according to the overall length of the lens system) are shown in the following order: short focal length extremity, intermediate focal length, and long focal length extremity.

An aspherical surface which is rotationally symmetrical about the optical axis is defined as:

$$x = cy^2/(1+[1-\{1+K\}c^2y^2]^{1/2}) + A4y^4 + A6y^6 + A8y^8 + A10y^{10} + A12y^{12} \ldots$$

wherein 'x' designates a distance from a tangent plane of the aspherical vertex, 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, and A12 designates a twelfth-order aspherical coefficient.

Embodiment 1

FIGS. 1 through 6H and Tables 1 through 3 show the first numerical embodiment of the zoom lens system according to the present invention. FIG. 1 shows a lens arrangement of the first numerical embodiment of the zoom lens system at the long focal length extremity when focused on an object at infinity. FIGS. 2A, 2B, 2C and 2D show various aberrations that occurred in the lens arrangement shown in FIG. 1. FIGS. 3A through 3H show lateral aberrations that occurred in the lens arrangement shown in FIG. 1. FIG. 4 shows a lens arrangement of the first numerical embodiment of the zoom lens system at the short focal length extremity when focused on an object at infinity. FIGS. 5A, 5B, 5C and 5D show various aberrations that occurred in the lens arrangement shown in FIG. 4. FIGS. 6A through 6H show lateral aberrations that occurred in the lens arrangement shown in FIG. 4. Table 1 shows the lens surface data, Table 2 shows various zoom lens system data, and Table 3 shows the aspherical surface data.

The zoom lens system of the first numerical embodiment is configured of a negative first lens group G1, a positive second lens group G2, and a positive third lens group G3, in that order from the object side.

The first lens group G1 (surface Nos. 1 through 4) is configured of a biconcave negative lens element 10 and a positive meniscus lens element having a convex surface on the object side, in that order from the object side. Each of the biconcave negative lens element 10 and the positive meniscus lens element 11 has an aspherical surface on each side thereof.

The second lens group G2 (surface Nos. 6 through 9) is configured of a biconvex positive lens element 20, and a negative meniscus lens element 21 having a convex surface on the object side, in that order from the object side. Each of the biconvex positive lens element 20 and the negative meniscus lens element 21 has an aspherical surface on each side thereof. A diaphragm S (surface No. 5) that is disposed between the first lens group G1 and the second lens group G2 moves integrally with the second lens group G2 during zooming.

The third lens group G3 (surface Nos. 10 and 11) is a positive meniscus lens element 30 having a convex surface on the image side. The positive meniscus lens element 30 has an aspherical surface on each side thereof. Two optical filters OP1 and OP2 (surface Nos. 12 through 15) are provided behind the third lens group G3 (the positive meniscus lens element 30) (and between the image plane I).

TABLE 1

LENS SURFACE DATA

| Surf. No. | r | d | Nd | νd |
|---|---|---|---|---|
| 1* | −99.817 | 0.653 | 1.80139 | 45.5 |
| 2* | 5.592 | 1.623 | | |
| 3* | 8.881 | 1.413 | 2.00178 | 19.3 |
| 4* | 14.522 | d4 | | |
| 5(Diaphragm) | ∞ | 0.600 | | |
| 6* | 3.531 | 2.163 | 1.61881 | 63.8 |
| 7* | −19.275 | 0.156 | | |
| 8* | 4.911 | 0.650 | 1.84666 | 23.8 |
| 9* | 2.542 | d9 | | |
| 10* | −187.726 | 1.516 | 1.54358 | 55.7 |
| 11* | −8.864 | d11 | | |
| 12 | ∞ | 0.400 | 1.51680 | 64.2 |
| 13 | ∞ | 0.510 | | |
| 14 | ∞ | 0.500 | 1.51680 | 64.2 |
| 15 | ∞ | — | | |

The asterisk (*) designates an aspherical surface which is rotationally symmetrical with respect to the optical axis.

TABLE 2

ZOOM LENS SYSTEM DATA
Zoom Ratio 4.85

| | Short Focal Length Extremity | Intermediate Focal Length | Long Focal Length Extremity |
|---|---|---|---|
| FNO. | 3.5 | 6.317 | 5.95 |
| f | 4.043 | 11.961 | 19.609 |
| W | 51.9 | 18.7 | 11.8 |
| Y | 3.875 | 3.875 | 3.875 |
| fB | 0.59 | 0.59 | 0.59 |
| L | 29.04 | 27.42 | 32.90 |
| d4 | 12.867 | 2.787 | 0.676 |
| d9 | 2.671 | 11.88 | 19.802 |
| d11 | 2.73 | 1.975 | 1.65 |

TABLE 3

ASPHERICAL SURFACE DATA (aspherical surface coefficients not indicated are zero (0.00)):

| Surf. No. | K | A4 | A6 | A8 | A10 |
|---|---|---|---|---|---|
| 1 | 0.000 | $0.1150 \times 10^{-2}$ | $-0.3445 \times 10^{-4}$ | $0.3067 \times 10^{-6}$ | |
| 2 | 0.000 | $0.7822 \times 10^{-4}$ | $0.6137 \times 10^{-4}$ | $-0.3078 \times 10^{-5}$ | |
| 3 | 0.000 | $-0.1709 \times 10^{-2}$ | $0.6876 \times 10^{-4}$ | $-0.2105 \times 10^{-6}$ | |
| 4 | 0.000 | $-0.1539 \times 10^{-2}$ | $0.6483 \times 10^{-4}$ | $-0.3518 \times 10^{-5}$ | $0.4908 \times 10^{-7}$ |
| 6 | 0.000 | $-0.2708 \times 10^{-3}$ | $0.7621 \times 10^{-4}$ | $0.8973 \times 10^{-5}$ | $-0.2541 \times 10^{-6}$ |
| 7 | 0.000 | $0.4792 \times 10^{-2}$ | $-0.7778 \times 10^{-4}$ | $-0.3044 \times 10^{-4}$ | $-0.1369 \times 10^{-5}$ |
| 8 | 0.000 | $-0.7574 \times 10^{-2}$ | $0.8447 \times 10^{-3}$ | $-0.2670 \times 10^{-3}$ | $0.1269 \times 10^{-5}$ |
| 9 | 0.000 | $-0.1300 \times 10^{-1}$ | $0.1876 \times 10^{-2}$ | $-0.6454 \times 10^{-3}$ | $0.5676 \times 10^{-4}$ |
| 10 | 0.000 | $-0.2907 \times 10^{-4}$ | $0.2663 \times 10^{-4}$ | $-0.1671 \times 10^{-5}$ | $-0.9392 \times 10^{-7}$ |
| 11 | 0.000 | $0.4846 \times 10^{-3}$ | $0.2346 \times 10^{-4}$ | $-0.2254 \times 10^{-5}$ | $-0.5106 \times 10^{-7}$ |

Embodiment 2

Figure 10:
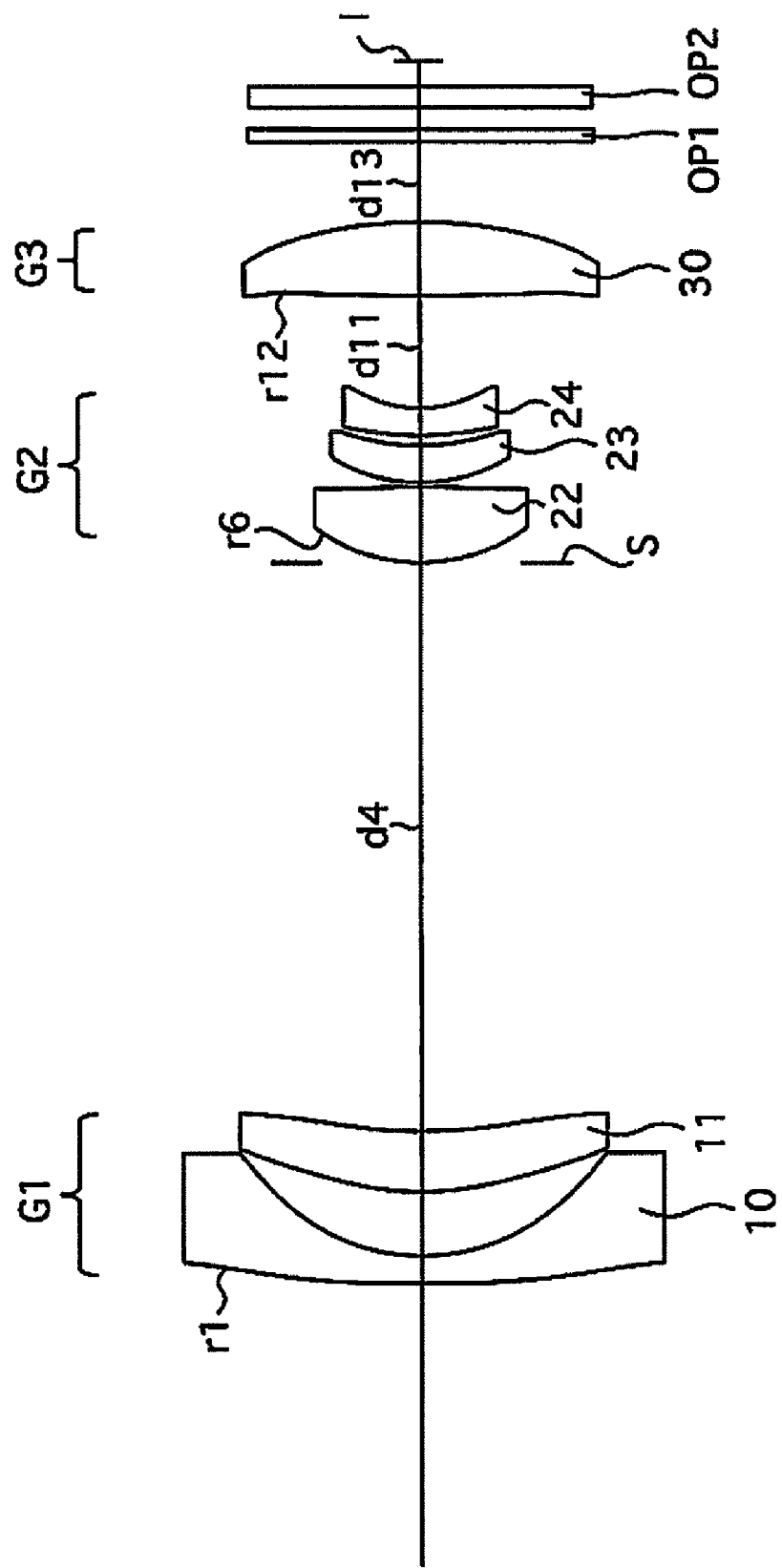
FIG. 10 shows a lens arrangement of the second numerical embodiment of the zoom lens system at the short focal length extremity when focused on an object at infinity.

FIGS. 7 through 12G and Tables 4 through 6 show the second numerical embodiment of the zoom lens system according to the present invention. FIG. 7 shows a lens arrangement of the second numerical embodiment of the zoom lens system at the long focal length extremity when focused on an object at infinity. FIGS. 8A, 8B, 8C and 8D show various aberrations that occurred in the lens arrangement shown in FIG. 7. FIGS. 9A through 9G show lateral aberrations that occurred in the lens arrangement shown in FIG. 7. FIG. 10 shows a lens arrangement of the second numerical embodiment of the zoom lens system at the short focal length extremity when focused on an object at infinity. FIGS. 11A, 11B, 11C and 11D show various aberrations that occurred in the lens arrangement shown in FIG. 10. FIGS. 12A through 12G show lateral aberrations that occurred in the lens arrangement shown in FIG. 10. Table 4 shows the lens surface data, Table 5 shows various zoom lens system data, and Table 6 shows the aspherical surface data.

The lens arrangement of the second numerical embodiment is the same as that of the first numerical embodiment except for the following points (1) through (3).

(1) The negative lens element 10 of the first lens group G1 is a negative meniscus lens element having a convex surface on the object side.

(2) The second lens group G2 (surface Nos. 6 through 11) is configured of a biconvex positive lens element 22, a positive meniscus lens element 23 having a convex surface on the object side, and a negative meniscus lens element 24 having a convex surface on the object side, in that order from the object side. Each of the biconvex positive lens element 22 and the negative meniscus lens element 24 has an aspherical surface on each side thereof. The positive meniscus lens element 23 is a spherical lens element (not an aspherical lens element).

(3) The third lens group G3 (surface Nos. 12 and 13) is a biconvex positive lens element.

TABLE 4

LENS SURFACE DATA

| Surf. No. | r | d | Nd | νd |
|---|---|---|---|---|
| 1* | 62.191 | 0.650 | 1.85135 | 40.1 |
| 2* | 4.936 | 1.525 | | |
| 3* | 7.151 | 1.424 | 2.00178 | 19.3 |
| 4* | 10.848 | d4 | | |
| 5(Diaphragm) | ∞ | 0.000 | | |
| 6* | 4.428 | 1.783 | 1.61881 | 63.8 |
| 7* | −25.713 | 0.100 | | |
| 8 | 4.028 | 0.884 | 1.49700 | 81.6 |
| 9 | 5.640 | 0.236 | | |
| 10* | 7.081 | 0.650 | 1.84666 | 23.8 |
| 11* | 2.961 | d11 | | |
| 12* | 54.330 | 1.730 | 1.54358 | 55.7 |
| 13* | −11.504 | d13 | | |
| 14 | ∞ | 0.300 | 1.51680 | 64.2 |
| 15 | ∞ | 0.510 | | |
| 16 | ∞ | 0.500 | 1.51680 | 64.2 |
| 17 | ∞ | — | | |

The asterisk (*) designates an aspherical surface which is rotationally symmetrical with respect to the optical axis.

TABLE 5

ZOOM LENS SYSTEM DATA
Zoom Ratio 4.85

| | Short Focal Length Extremity | Intermediate Focal Length | Long Focal Length Extremity |
|---|---|---|---|
| FNO. | 3.6 | 5.952 | 5.95 |
| f | 4.192 | 11 | 20.332 |
| W | 51.0 | 20.3 | 11.4 |
| Y | 3.875 | 3.875 | 3.875 |
| fB | 0.59 | 0.59 | 0.59 |
| L | 28.89 | 25.39 | 32.5 |
| d4 | 13.471 | 3.809 | 1.471 |
| d11 | 2.657 | 8.762 | 18.495 |
| d13 | 2.152 | 2.521 | 1.65 |

TABLE 6

ASPHERICAL SURFACE DATA (aspherical surface coefficients not indicated are zero (0.00)):

| Surf. No. | K | A4 | A6 | A8 | A10 |
|---|---|---|---|---|---|
| 1 | 0.000 | $0.9087 \times 10^{-3}$ | $-0.2561 \times 10^{-4}$ | $0.6734 \times 10^{-7}$ | $0.2047 \times 10^{-8}$ |
| 2 | 0.000 | $0.1837 \times 10^{-3}$ | $-0.5218 \times 10^{-4}$ | $0.6272 \times 10^{-5}$ | $-0.2969 \times 10^{-6}$ |
| 3 | 0.000 | $-0.1108 \times 10^{-2}$ | $-0.1075 \times 10^{-3}$ | $0.8390 \times 10^{-5}$ | $-0.1767 \times 10^{-6}$ |
| 4 | 0.000 | $-0.1111 \times 10^{-2}$ | $-0.9215 \times 10^{-4}$ | $0.7464 \times 10^{-5}$ | $-0.1732 \times 10^{-6}$ |
| 6 | 0.000 | $0.1344 \times 10^{-3}$ | $0.1134 \times 10^{-3}$ | | |
| 7 | 0.000 | $0.1707 \times 10^{-2}$ | $0.1329 \times 10^{-3}$ | $-0.1606 \times 10^{-4}$ | |

TABLE 6-continued

ASPHERICAL SURFACE DATA (aspherical surface coefficients not indicated are zero (0.00)):

| Surf. No. | K | A4 | A6 | A8 | A10 |
|---|---|---|---|---|---|
| 10 | 0.000 | $-0.2276 \times 10^{-2}$ | $-0.2860 \times 10^{-4}$ | $-0.1384 \times 10^{-3}$ | |
| 11 | 0.000 | $-0.1705 \times 10^{-2}$ | $0.2942 \times 10^{-3}$ | $-0.2354 \times 10^{-3}$ | |
| 12 | 0.000 | $-0.5450 \times 10^{-3}$ | $0.6057 \times 10^{-4}$ | $-0.3940 \times 10^{-5}$ | |
| 13 | 0.000 | $-0.4189 \times 10^{-3}$ | $0.5061 \times 10^{-4}$ | $-0.3279 \times 10^{-5}$ | |

Embodiment 3

Figure 13:
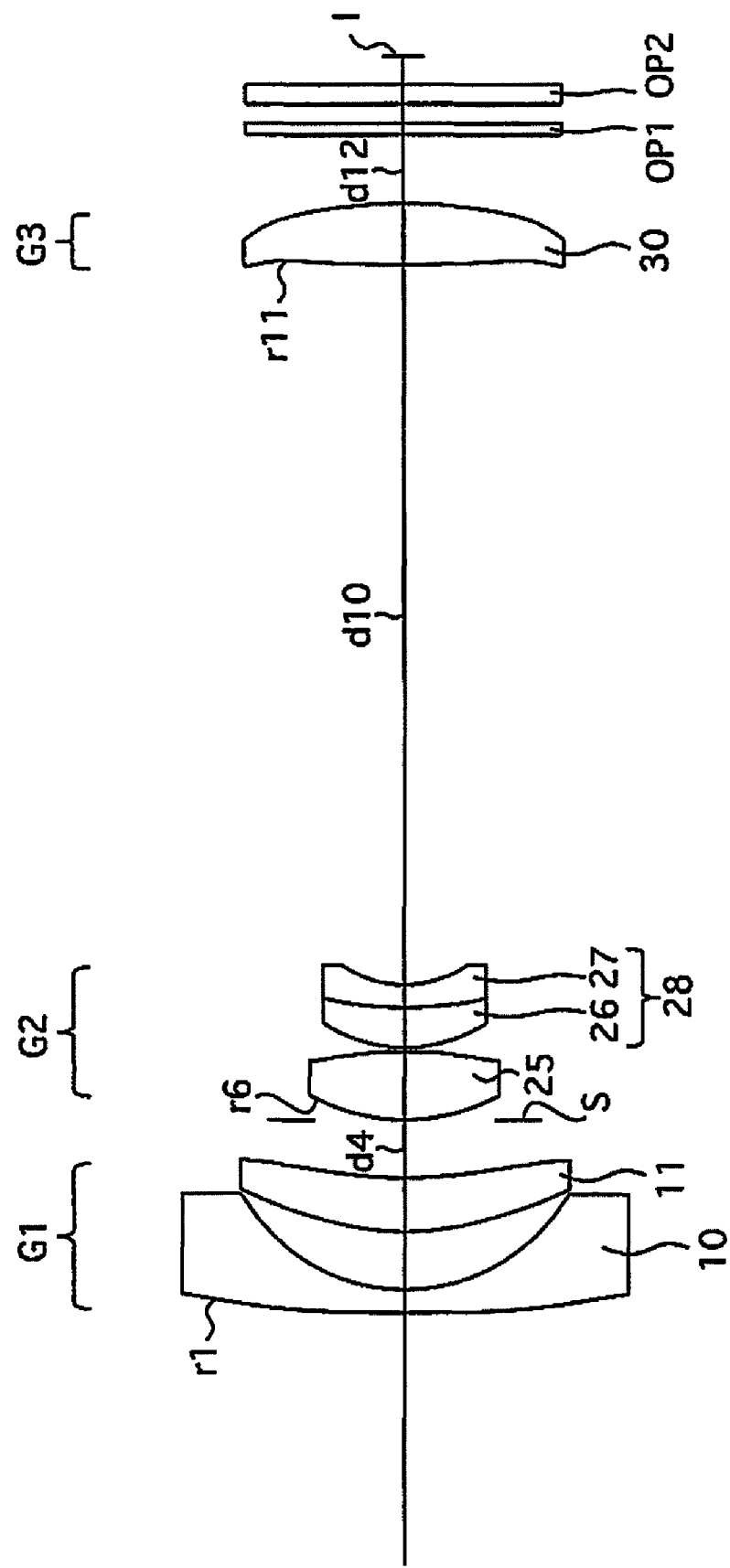
FIG. 13 shows a lens arrangement of a third numerical embodiment of the zoom lens system, according to the present invention, at the long focal length extremity when focused on an object at infinity.

FIGS. 13 through 18G and Tables 7 through 9 show the third numerical embodiment of the zoom lens system according to the present invention. FIG. 13 shows a lens arrangement of the third numerical embodiment of the zoom lens system at the long focal length extremity when focused on an object at infinity. FIGS. 14A, 14B, 14C and 14D show various aberrations that occurred in the lens arrangement shown in FIG. 13. FIGS. 15A through 15G show lateral aberrations that occurred in the lens arrangement shown in FIG. 13. FIG. 16 shows a lens arrangement of the third numerical embodiment of the zoom lens system at the short focal length extremity when focused on an object at infinity. FIGS. 17A, 17B, 17C and 17D show various aberrations that occurred in the lens arrangement shown in FIG. 16. FIGS. 18A through 18G show lateral aberrations that occurred in the lens arrangement shown in FIG. 16. Table 7 shows the lens surface data, Table 8 shows various zoom lens system data, and Table 9 shows the aspherical surface data.

The lens arrangement of the third numerical embodiment is the same as that of the first numerical embodiment except for the following points (1) through (3).

(1) The negative lens element 10 of the first lens group G1 is a negative meniscus lens element having a convex surface on the object side.

(2) The second lens group G2 (surface Nos. 6 through 10) is configured of a biconvex positive lens element 25, and a cemented lens 28 formed from a positive meniscus lens element 26 having a convex surface on the object side and a negative meniscus lens element 27 having a convex surface on the object side, in that order from the object side. The biconvex positive lens element 25 has an aspherical surface on each side thereof. The positive meniscus lens element 26 has an aspherical surface on the object side thereof.

(3) The positive lens element 30 (surface Nos. 11 and 12) of the third lens group G3 is a biconvex positive lens element.

TABLE 7

LENS SURFACE DATA

| Surf. No. | r | d | Nd | vd |
|---|---|---|---|---|
| 1* | 67.936 | 0.600 | 1.85135 | 40.1 |
| 2* | 4.707 | 1.517 | | |
| 3* | 6.671 | 1.402 | 2.00178 | 19.3 |
| 4* | 10.441 | d4 | | |
| 5(Diaphragm) | ∞ | 0.000 | | |
| 6* | 4.927 | 1.783 | 1.61881 | 63.8 |
| 7* | -12.057 | 0.100 | | |
| 8* | 3.791 | 1.051 | 1.49710 | 81.6 |
| 9 | 9.448 | 0.600 | 2.00100 | 29.1 |
| 10 | 2.919 | d10 | | |
| 11* | 41.467 | 1.597 | 1.54358 | 55.7 |
| 12* | -13.174 | d12 | | |
| 13 | ∞ | 0.300 | 1.51680 | 64.2 |
| 14 | ∞ | 0.510 | | |
| 15 | ∞ | 0.500 | 1.51680 | 64.2 |
| 16 | ∞ | — | | |

The asterisk (*) designates an aspherical surface which is rotationally symmetrical with respect to the optical axis.

TABLE 8

ZOOM LENS SYSTEM DATA
Zoom Ratio 4.87

| | Short Focal Length Extremity | Intermediate Focal Length | Long Focal Length Extremity |
|---|---|---|---|
| FNO. | 3.6 | 5.509 | 5.95 |
| f | 4.17 | 10 | 20.329 |
| W | 49.6 | 22.3 | 11.3 |
| Y | 3.875 | 3.875 | 3.875 |
| fB | 0.59 | 0.59 | 0.59 |
| L | 29.13 | 25.34 | 32.80 |
| d4 | 13.72 | 4.171 | 1.52 |
| d10 | 2.885 | 7.333 | 18.93 |
| d12 | 1.975 | 3.29 | 1.8 |

TABLE 9

ASPHERICAL SURFACE DATA (aspherical surface coefficients not indicated are zero (0.00)):

| Surf. No. | K | A4 | A6 | A8 | A10 |
|---|---|---|---|---|---|
| 1 | 0.000 | $0.1182 \times 10^{-4}$ | $0.3958 \times 10^{-4}$ | $-0.1687 \times 10^{-5}$ | $0.2026 \times 10^{-7}$ |
| 2 | 0.000 | $-0.1613 \times 10^{-2}$ | $0.4409 \times 10^{-4}$ | $0.6701 \times 10^{-5}$ | $-0.4133 \times 10^{-6}$ |
| 3 | 0.000 | $-0.1543 \times 10^{-2}$ | $-0.7977 \times 10^{-4}$ | $0.8537 \times 10^{-5}$ | $-0.2111 \times 10^{-6}$ |
| 4 | 0.000 | $-0.1167 \times 10^{-2}$ | $-0.9982 \times 10^{-4}$ | $0.9934 \times 10^{-5}$ | $-0.2712 \times 10^{-6}$ |
| 6 | 0.000 | $-0.8745 \times 10^{-3}$ | $-0.9255 \times 10^{-4}$ | $0.2505 \times 10^{-5}$ | |
| 7 | 0.000 | $-0.2101 \times 10^{-3}$ | $0.3196 \times 10^{-4}$ | | |
| 8 | 0.000 | $-0.1403 \times 10^{-2}$ | $0.1742 \times 10^{-4}$ | $0.5717 \times 10^{-5}$ | |
| 11 | 0.000 | $0.5228 \times 10^{-3}$ | $-0.5419 \times 10^{-4}$ | $-0.1733 \times 10^{-5}$ | |
| 12 | 0.000 | $0.1016 \times 10^{-2}$ | $-0.9574 \times 10^{-4}$ | $-0.1942 \times 10^{-6}$ | |

Embodiment 4

Figure 19:
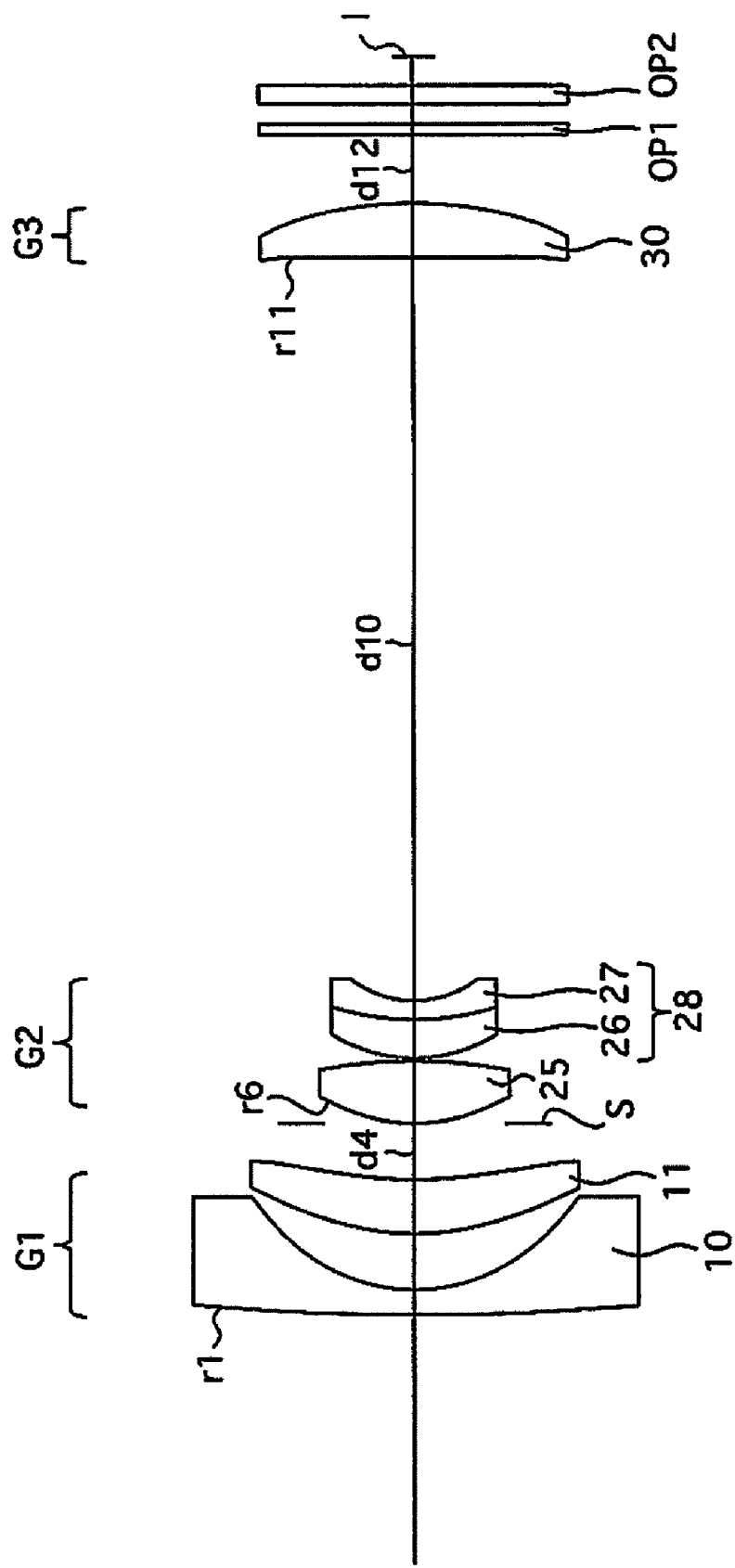
FIG. 19 shows a lens arrangement of a fourth numerical embodiment of the zoom lens system, according to the present invention, at the long focal length extremity when focused on an object at infinity.
Figure 23A:
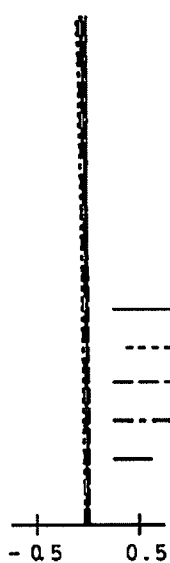
FIGS. 23A, 23B, 23C and 23D show various aberrations that occurred in the lens arrangement shown in FIG. 22.
Figure 23B:
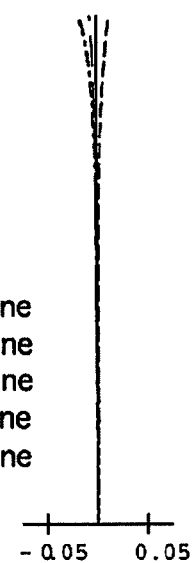
Figure 23C:
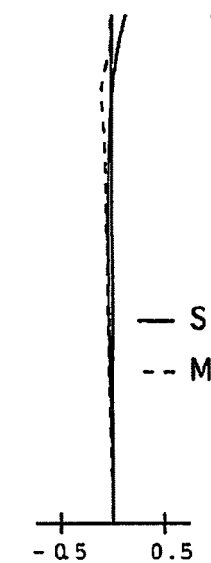
Figure 23D:
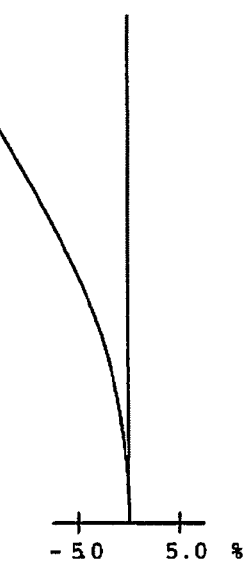

FIGS. 19 through 24G and Tables 10 through 12 show the fourth numerical embodiment of the zoom lens system according to the present invention. FIG. 19 shows a lens arrangement of the fourth numerical embodiment of the zoom lens system at the long focal length extremity when focused on an object at infinity. FIGS. 20A, 20B, 20C and 20D show various aberrations that occurred in the lens arrangement shown in FIG. 19. FIGS. 21A through 21G show lateral aberrations that occurred in the lens arrangement shown in FIG. 20. FIG. 22 shows a lens arrangement of the fourth numerical embodiment of the zoom lens system at the short focal length extremity when focused on an object at infinity. FIGS. 23A, 23B, 23C and 23D show various aberrations that occurred in the lens arrangement shown in FIG. 22. FIGS. 24A through 24G show lateral aberrations that occurred in the lens arrangement shown in FIG. 22. Table 10 shows the lens surface data, Table 11 shows various zoom lens system data, and Table 12 shows the aspherical surface data.

The lens arrangement of the fourth numerical embodiment is the same as that of the third numerical embodiment.

TABLE 10

LENS SURFACE DATA

| Surf. No. | r | d | Nd | vd |
|---|---|---|---|---|
| 1* | 600.000 | 0.650 | 1.75501 | 51.2 |
| 2* | 4.806 | 1.485 | | |
| 3* | 6.750 | 1.428 | 1.82115 | 24.1 |
| 4* | 11.216 | d4 | | |
| 5(Diaphragm) | ∞ | 0.000 | | |
| 6* | 4.513 | 1.646 | 1.59201 | 67.0 |
| 7* | −15.784 | 0.070 | | |
| 8* | 3.881 | 1.031 | 1.58313 | 59.5 |
| 9 | 7.454 | 0.500 | 2.00100 | 29.1 |
| 10 | 2.817 | d10 | | |
| 11* | 221.402 | 1.436 | 1.54358 | 55.7 |
| 12* | −10.303 | d12 | | |
| 13 | ∞ | 0.300 | 1.51680 | 64.2 |
| 14 | ∞ | 0.510 | | |
| 15 | ∞ | 0.500 | 1.51680 | 64.2 |
| 16 | ∞ | — | | |

The asterisk (*) designates an aspherical surface which is rotationally symmetrical with respect to the optical axis.

TABLE 11

ZOOM LENS SYSTEM DATA
Zoom Ratio 4.87

| | Short Focal Length Extremity | Intermediate Focal Length | Long Focal Length Extremity |
|---|---|---|---|
| FN0. | 3.6 | 5.283 | 5.95 |
| f | 4.217 | 9 | 20.56 |
| W | 49.5 | 24.5 | 11.2 |
| Y | 3.875 | 3.875 | 3.875 |
| fB | 0.59 | 0.59 | 0.59 |
| L | 29.10 | 25.70 | 33.00 |
| d4 | 13.68 | 5.373 | 1.48 |
| d10 | 2.851 | 7.6 | 19.574 |
| d12 | 2.424 | 2.535 | 1.8 |

TABLE 12

ASPHERICAL SURFACE DATA (aspherical surface coefficients not indicated are zero (0.00)):

| Surf. No. | K | A4 | A6 | A8 | A10 | A12 |
|---|---|---|---|---|---|---|
| 1 | 0.000 | $0.5707 \times 10^{-3}$ | $-0.1525 \times 10^{-4}$ | $0.1248 \times 10^{-7}$ | $0.2667 \times 10^{-8}$ | |
| 2 | 0.000 | $-0.4634 \times 10^{-3}$ | $-0.2122 \times 10^{-4}$ | $0.5968 \times 10^{-5}$ | $-0.3274 \times 10^{-6}$ | |
| 3 | 0.000 | $-0.1355 \times 10^{-2}$ | $-0.4641 \times 10^{-4}$ | $0.8010 \times 10^{-5}$ | $-0.2566 \times 10^{-6}$ | |
| 4 | 0.000 | $-0.1194 \times 10^{-2}$ | $-0.3615 \times 10^{-4}$ | $0.5956 \times 10^{-5}$ | $-0.2016 \times 10^{-6}$ | |
| 6 | 0.000 | $-0.6730 \times 10^{-3}$ | $-0.2225 \times 10^{-3}$ | $0.8251 \times 10^{-5}$ | | |
| 7 | 0.000 | $-0.1562 \times 10^{-2}$ | $0.1088 \times 10^{-3}$ | | | |
| 8 | 0.000 | $-0.2957 \times 10^{-2}$ | $0.1223 \times 10^{-3}$ | $0.9610 \times 10^{-5}$ | | |
| 11 | 0.000 | $0.6515 \times 10^{-3}$ | $-0.1064 \times 10^{-3}$ | $0.5198 \times 10^{-5}$ | $-0.2419 \times 10^{-6}$ | $0.5056 \times 10^{-8}$ |
| 12 | 0.000 | $0.1279 \times 10^{-2}$ | $-0.1416 \times 10^{-3}$ | $0.5339 \times 10^{-5}$ | $-0.1463 \times 10^{-6}$ | $0.2063 \times 10^{-8}$ |

Embodiment 5

Figure 25:
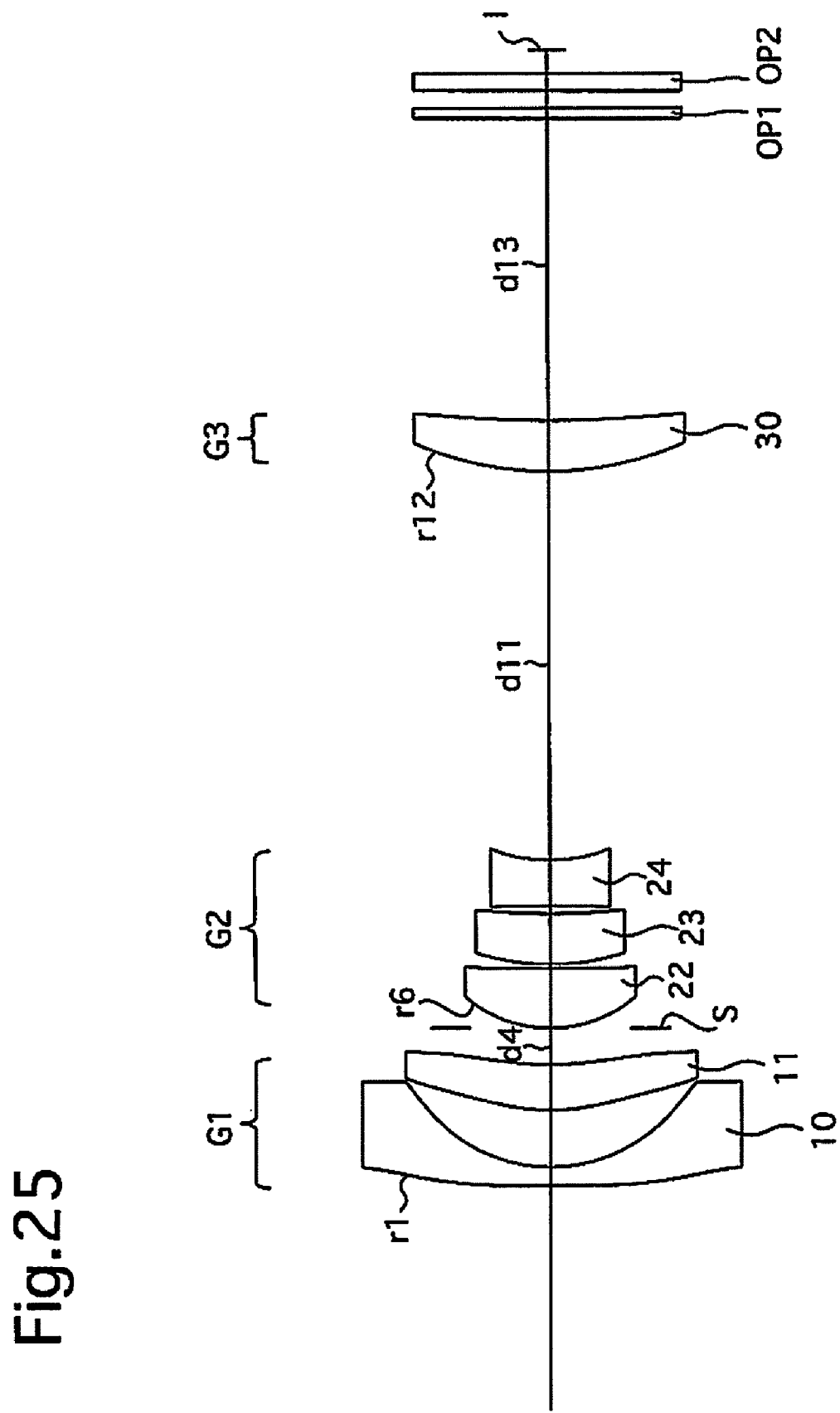
FIG. 25 shows a lens arrangement of a fifth numerical embodiment of the zoom lens system, according to the present invention, at the long focal length extremity when focused on an object at infinity.

FIGS. 25 through 30G and Tables 13 through 15 show the fifth numerical embodiment of the zoom lens system according to the present invention. FIG. 25 shows a lens arrangement of the fifth numerical embodiment of the zoom lens system at the long focal length extremity when focused on an object at infinity. FIGS. 26A, 26B, 26C and 26D show various aberrations that occurred in the lens arrangement shown in FIG. 25. FIGS. 27A through 27G show lateral aberrations that occurred in the lens arrangement shown in FIG. 25. FIG. 28 shows a lens arrangement of the fifth numerical embodiment of the zoom lens system at the short focal length extremity when focused on an object at infinity. FIGS. 29A, 29B, 29C and 29D show various aberrations that occurred in the lens arrangement shown in FIG. 28. FIGS. 30A through 30G show lateral aberrations that occurred in the lens arrangement shown in FIG. 28. Table 13 shows the lens surface data, Table 14 shows various zoom lens system data, and Table 15 shows the aspherical surface data.

The lens arrangement of the fifth numerical embodiment is the same as that of the second numerical embodiment except for the following points (1) and (2).

(1) The negative lens element 24 of the second lens group G2 is a biconcave negative lens element.

(2) The positive lens element 30 of the third lens group G3 is a positive meniscus lens element having a convex surface on the object side.

TABLE 13

LENS SURFACE DATA

| Surf. No. | r | d | Nd | vd |
|---|---|---|---|---|
| 1* | 175.353 | 0.550 | 1.85135 | 40.1 |
| 2* | 4.865 | 1.677 | | |
| 3* | 6.482 | 1.342 | 2.00178 | 19.3 |
| 4* | 9.735 | d4 | | |
| 5(Diaphragm) | ∞ | 0.000 | | |
| 6* | 4.148 | 1.783 | 1.61881 | 63.8 |
| 7* | −48.578 | 0.100 | | |
| 8 | 7.329 | 1.511 | 1.49700 | 81.6 |
| 9 | 20.199 | 0.243 | | |
| 10* | −29.483 | 1.356 | 1.84666 | 23.8 |
| 11* | 6.131 | d11 | | |
| 12* | 10.034 | 1.511 | 1.54358 | 55.7 |
| 13* | 32.048 | d13 | | |
| 14 | ∞ | 0.300 | 1.51680 | 64.2 |
| 15 | ∞ | 0.510 | | |
| 16 | ∞ | 0.500 | 1.51680 | 64.2 |
| 17 | ∞ | — | | |

The asterisk (*) designates an aspherical surface which is rotationally symmetrical with respect to the optical axis.

TABLE 14

ZOOM LENS SYSTEM DATA
Zoom Ratio 4.85

| | Short Focal Length Extremity | Intermediate Focal Length | Long Focal Length Extremity |
|---|---|---|---|
| FNO. | 3.6 | 6.104 | 5.95 |
| f | 4.17 | 11 | 20.225 |
| W | 50.7 | 20.2 | 11.7 |
| Y | 3.875 | 3.875 | 3.875 |
| fB | 0.59 | 0.59 | 0.59 |
| L | 30.00 | 25.14 | 33.5 |
| d4 | 14.268 | 3.665 | 1.081 |
| d11 | 2.111 | 3.687 | 11.533 |
| d13 | 1.65 | 5.812 | 8.912 |

TABLE 15

ASPHERICAL SURFACE DATA (aspherical surface coefficients not indicated are zero (0.00)):

| Surf. No. | K | A4 | A6 | A8 | A10 |
|---|---|---|---|---|---|
| 1 | 0.000 | $0.1287 \times 10^{-2}$ | $-0.2604 \times 10^{-4}$ | $-0.9489 \times 10^{-7}$ | $0.2626 \times 10^{-8}$ |
| 2 | 0.000 | $-0.3539 \times 10^{-3}$ | $0.7470 \times 10^{-5}$ | $0.6516 \times 10^{-5}$ | $-0.3895 \times 10^{-6}$ |
| 3 | 0.000 | $-0.2042 \times 10^{-2}$ | $-0.9880 \times 10^{-4}$ | $0.7000 \times 10^{-5}$ | $-0.1005 \times 10^{-6}$ |
| 4 | 0.000 | $-0.1600 \times 10^{-2}$ | $-0.1173 \times 10^{-3}$ | $0.8707 \times 10^{-5}$ | $-0.1599 \times 10^{-6}$ |
| 6 | 0.000 | $0.3148 \times 10^{-3}$ | $0.1175 \times 10^{-3}$ | | |
| 7 | 0.000 | $0.2336 \times 10^{-2}$ | $0.2121 \times 10^{-3}$ | $-0.2756 \times 10^{-4}$ | |
| 10 | 0.000 | $0.3100 \times 10^{-2}$ | $-0.3532 \times 10^{-3}$ | $-0.1472 \times 10^{-3}$ | |
| 11 | 0.000 | $0.7141 \times 10^{-2}$ | $-0.2590 \times 10^{-4}$ | $-0.9649 \times 10^{-4}$ | |
| 12 | 0.000 | $-0.3301 \times 10^{-4}$ | $-0.3063 \times 10^{-5}$ | $0.1229 \times 10^{-6}$ | |
| 13 | 0.000 | $-0.1472 \times 10^{-3}$ | $-0.4845 \times 10^{-5}$ | $0.2396 \times 10^{-6}$ | |

The numerical values of each condition for each numerical embodiment are shown in Table 16.

TABLE 16

| | | Embod. 1 | Embod. 2 | Embod. 3 | Embod. 4 | Embod. 5 |
|---|---|---|---|---|---|---|
| Cond. | (1) | 0.42 | 0.39 | 0.39 | 0.40 | 0.38 |
| Cond. | (2) | −2.77 | −2.26 | −2.73 | −2.90 | −1.08 |
| Cond. | (3) | −0.11 | −0.13 | −0.12 | −0.12 | −0.20 |

As can be understood from Table 16, the first through fifth numerical embodiments satisfy conditions (1) through (3). Furthermore, as can be understood from the aberration diagrams, the various aberrations are suitably corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprising a negative first lens group, a positive second lens group and a positive third lens group, in that order from the object side, wherein a distance in the optical axis direction between each lens group changes during zooming from the short focal length extremity to the long focal length extremity, and wherein the following conditions (1) and (2) are satisfied:

$$0.20 < F2/Ft < 0.45 \quad (1), \text{ and}$$

$$-3.00 < F2/fm < -1.00 \quad (2), \text{ wherein}$$

F2 designates the combined focal length of said second lens group,

Ft designates the focal length of the entire said zoom lens system at the long focal length extremity, fm designates the focal length of the surface on the image side of the lens element that is provided closest to the image side within said second lens group, $$fm = (1-nm)/rm,$$

nm designates the refractive index at the d-line of said lens element that is provided closest to the image side within said second lens group, and rm designates the radius of curvature of said surface on the image side of said lens element that is provided closest to the image side within said second lens group.

2. The zoom lens system according to claim 1, wherein the following condition (3) is satisfied:

$$-0.25 < (m2t-m2w)/(2GLt-2GLw) < -0.10 \quad (3), \text{ wherein}$$

m2t designates the magnification with respect to an object at infinity at the long focal length extremity of the second lens group, m2w designates the magnification with respect to an object at infinity at the short focal length extremity of the second lens group, 2GLt designates the distance from the surface on the object side of the lens element that is provided closest to the object side within said second lens group to the image plane at the long focal length extremity, and 2GLw designates the distance from the surface on the object side of the lens element that is provided closest to the object side within said second lens group to the image plane at the short focal length extremity.

3. The zoom lens system according to claim 1, wherein said first lens group comprises a negative lens element and a positive lens element, in that order from the object side.

4. The zoom lens system according to claim 1, wherein said second lens group comprises at least a positive lens element and a negative lens element, in that order from the object side.

5. The zoom lens system according to claim 4, wherein said second lens group comprises a positive lens element, a positive lens element and a negative lens element, in that order from the object side.

6. The zoom lens system according to claim 5, wherein the positive lens element that is provided on the image side, within said second lens group, and said negative lens element of said second lens group are bonded to each other to form a cemented lens.

7. The zoom lens system according to claim 1, wherein said third lens group comprises one positive lens element.

* * * * *